(12) United States Patent
Kawada et al.

(10) Patent No.: US 11,958,114 B2
(45) Date of Patent: Apr. 16, 2024

(54) LAMINATION MOLDING APPARATUS

(71) Applicant: Sodick Co., Ltd., Kanagawa (JP)

(72) Inventors: Shuichi Kawada, Kanagawa (JP);
Katsutaka Muranaka, Kanagawa (JP);
Yoshitaka Kato, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 17/327,774

(22) Filed: May 24, 2021

(65) Prior Publication Data

US 2021/0370405 A1  Dec. 2, 2021

(30) Foreign Application Priority Data

Jun. 2, 2020 (JP) ................................ 2020-096084

(51) Int. Cl.
| | |
|---|---|
| *B22F 12/17* | (2021.01) |
| *B33Y 30/00* | (2015.01) |
| *B22F 12/41* | (2021.01) |
| *B22F 12/00* | (2021.01) |

(52) U.S. Cl.
CPC ............ *B22F 12/17* (2021.01); *B22F 12/224* (2021.01); *B22F 12/41* (2021.01); *B33Y 30/00* (2014.12)

(58) Field of Classification Search
None
See application file for complete search history.

(56) References Cited

U.S. PATENT DOCUMENTS

| | | | | |
|---|---|---|---|---|
| 11,247,397 | B1 * | 2/2022 | Snyder | ............... B29C 64/20 |
| 2014/0265047 | A1 * | 9/2014 | Burris | .................. B23K 26/083 |
| | | | | 264/497 |
| 2017/0304897 | A1 * | 10/2017 | Walrand | .................. B22F 12/44 |
| 2019/0061001 | A1 | 2/2019 | Araie et al. | |
| 2020/0188998 | A1 | 6/2020 | Saito | |

FOREIGN PATENT DOCUMENTS

| | | | | | |
|---|---|---|---|---|---|
| CN | 107907959 | A | * | 4/2018 | ............... G02B 7/00 |
| CN | 207278699 | U | * | 4/2018 | |
| JP | 2011033607 | A | * | 2/2011 | |
| JP | 6295001 | | | 3/2018 | |
| JP | 2019044210 | A | * | 3/2019 | |
| JP | 2020094250 | | | 6/2020 | |
| KR | 20190115188 | A | * | 11/2019 | |
| WO | WO-2015177804 | A1 | * | 11/2015 | ............... F03G 3/06 |
| WO | WO-2021118620 | A1 | * | 6/2021 | ............... B22F 12/22 |

\* cited by examiner

*Primary Examiner* — Farah Taufiq

(74) *Attorney, Agent, or Firm* — JCIPRNET

(57) ABSTRACT

A lamination molding apparatus including: an irradiator irradiating a material layer with a beam to form a solidified layer; and a temperature adjustment device which abuts against a part or all of the solidified body including an upper surface of the solidified body, and heats and cools the part or all of the solidified body to a set temperature. The temperature adjustment device has a temperature adjustment plate and a revolving portion. The revolving portion sets the temperature adjustment plate to an upright state when the part or all of the solidified body including the upper surface of the solidified body is not heated and cooled by the temperature adjustment device, and sets the temperature adjustment plate to a lying state when the part or all of the solidified body including the upper surface of the solidified body is heated and cooled by the temperature adjustment device.

6 Claims, 22 Drawing Sheets

LAMINATION MOLDING APPARATUS

CROSS-REFERENCE TO RELATED APPLICATION

This application claims the priority benefit of Japan application serial no. 2020-096084, filed on Jun. 2, 2020. The entirety of the above-mentioned patent application is hereby incorporated by reference herein and made a part of this specification.

BACKGROUND

Technical Field

The disclosure relates to a lamination molding apparatus of a three-dimensional molded object.

Related Art

There are a plurality of methods for metal laminate molding, and for example, with respect to a sintering laminate molding method, in a closed chamber filled with an inert gas, a material powder made of a metal material is laminated on a molding table that can be moved in an up-down direction, and a laser light or an electron beam is irradiated to a predetermined section of the laminated material layer to melt or sinter the material powder at the irradiation position, and thereby a plurality of solidified layers are formed. The plurality of solidified layers are laminated, and a desired three-dimensional molded object is formed. Here, the solidified layer includes a melted layer and a sinter layer. In addition, the laminated solidified layer is referred to as a solidified body.

In this metal laminate molding, temperature adjustment may be performed on the three-dimensional molded object after molding or the solidified layer during molding. For example, in Patent literature 1 (Japanese Patent No. 6295001) and Patent literature 2 (Japanese Patent Application No. 2018-234241), disclosed is an invention relating to a lamination molding apparatus and a manufacturing method of a three-dimensional molded object which can suppress deformation of the molded object by reducing a tension stress due to metal contraction by a compression stress due to martensitic transformation and controlling a residual stress of the molded object in a manner of intentionally progressing the martensitic transformation each time one or more solidified layers are formed. Here, in order to intentionally progress the martensitic transformation, adjustment to a predetermined temperature is performed on the solidified layers each time the one or more solidified layers are formed.

However, when the laminate molding method as described in Patent literature 1 is performed, the solidified layer is cooled and heated. Conventionally, the temperature adjustment of the solidified layer is performed by a temperature adjustment mechanism arranged in the molding table, and thus it is necessary to cool and heat the entire laminated solidified body each time the one or more solidified layers are formed. When this temperature adjustment method is performed, there is a problem that the temperature adjustment takes a long time, and a cooling waiting time is not fixed because a temperature response time of an upper surface of the solidified body differs according to the height of the solidified body.

The problem in the temperature adjustment mechanism arranged in the molding table can be expected to be solved by a temperature adjustment method in which a temperature adjustment device is arranged in a machining head and a cooling plate is closely attached to the upper surface of the laminated solidified body as in Patent literature 2.

Meanwhile, it is known that the progress of the martensitic transformation can be further promoted not only by cooling but also by heating the upper surface of the laminated solidified body. Therefore, a simple mechanism is desired which is capable of not only cooling but also heating the upper surface of the solidified body without interfering with other steps and is capable of switching from heating to cooling in a shorter time.

In addition, strictly, a parallelism of the upper surface of the solidified body is different for each layer, and thus if the cooling plate is merely revolved from an upright state to a lying state and arranged on the upper surface of the solidified body, there is a possibility that the cooling plate does not properly abut against the upper surface of the solidified body and only contacts a part of the upper surface of the solidified body, and the upper surface of the solidified body cannot be uniformly and evenly cooled. In this way, even when the parallelism of the solidified body is poor, if the upper surface of the solidified body can be cooled uniformly and evenly, the upper surface of the solidified body can be heated and cooled more efficiently.

The disclosure provides a lamination molding apparatus of a three-dimensional molded object capable of quickly and uniformly heating and cooling the upper surface of the solidified body without interfering with other steps.

SUMMARY

A lamination molding apparatus of the disclosure includes: an irradiator irradiating a material layer with a beam to form a solidified layer, wherein the material layer is formed for each of a plurality of divided layers obtained by dividing a desired three-dimensional molded object at a predetermined height in 22a molding region; and a temperature adjustment device which abuts against a part or all of a solidified body, which includes an upper surface of the solidified body that is formed by laminating the solidified layer, and heats and cools the part or all of the solidified body to a set temperature. The temperature adjustment device has a temperature adjustment plate which is heated and cooled to the set temperature, and includes a revolving portion which revolves the temperature adjustment plate between an upright state in which the temperature adjustment plate stands upright along a vertical direction and a lying state in which the temperature adjustment plate lies down along a horizontal direction. The revolving portion sets the temperature adjustment plate to the upright state when the part or all of the solidified body including the upper surface of the solidified body is not heated and cooled by the temperature adjustment device, and sets the temperature adjustment plate to the lying state when the part or all of the solidified body including the upper surface of the solidified body is heated and cooled by the temperature adjustment device.

DESCRIPTION OF THE EMBODIMENTS

Figure 1:
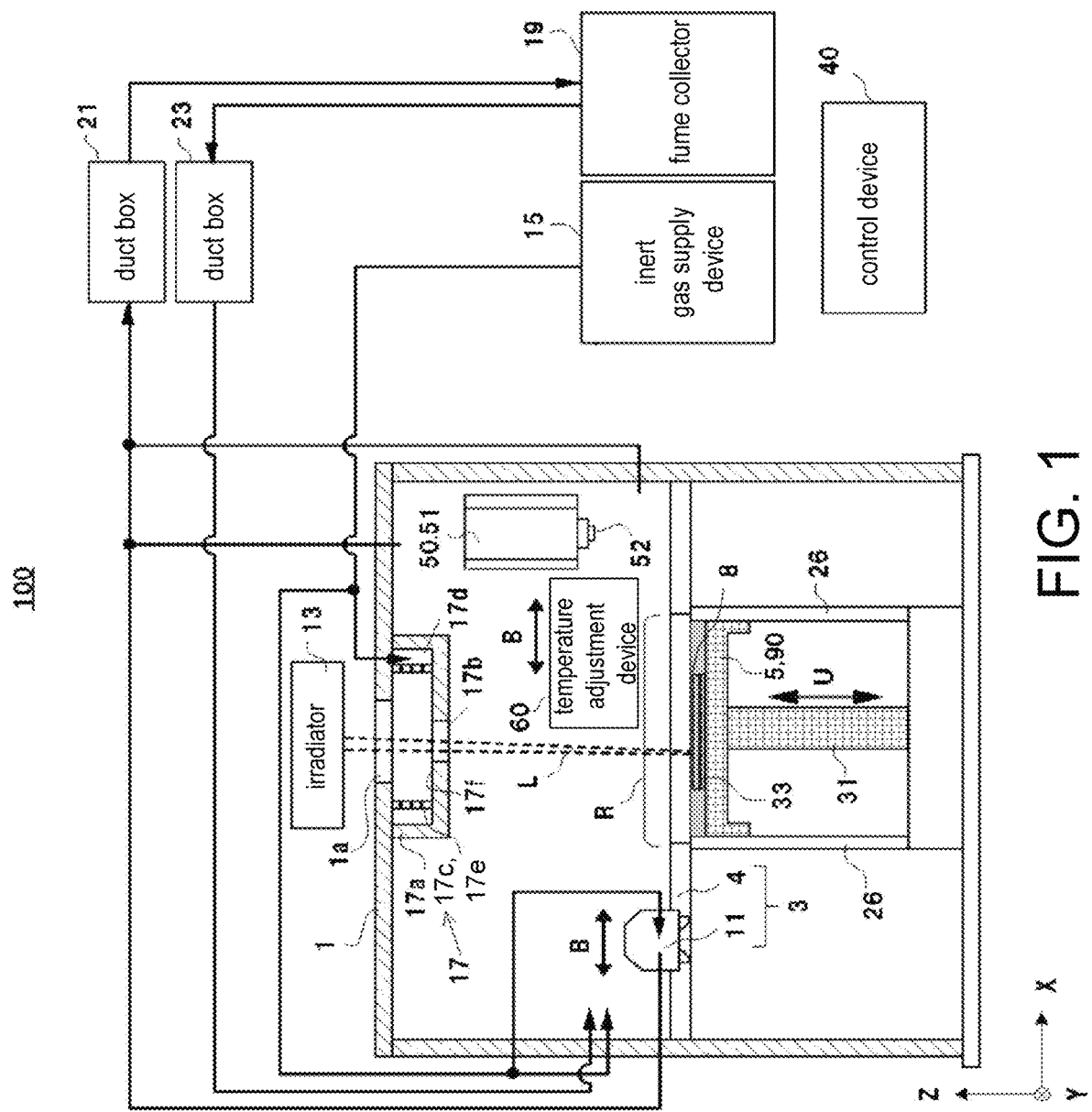
FIG. 1 is a schematic front view of a lamination molding apparatus 100 according to a first embodiment of the disclosure.

A lamination molding apparatus of the disclosure includes: an irradiator irradiating a material layer with a beam to form a solidified layer, wherein the material layer is formed for each of a plurality of divided layers obtained by dividing a desired three-dimensional molded object at a predetermined height in a molding region; and a temperature adjustment device which abuts against a part or all of a solidified body, which includes an upper surface of the solidified body that is formed by laminating the solidified layer, and heats and cools the part or all of the solidified body to a set temperature. The temperature adjustment device has a temperature adjustment plate which is heated and cooled to the set temperature, and includes a revolving portion which revolves the temperature adjustment plate between an upright state in which the temperature adjustment plate stands upright along a vertical direction and a lying state in which the temperature adjustment plate lies down along a horizontal direction. The revolving portion sets the temperature adjustment plate to the upright state when the part or all of the solidified body including the upper surface of the solidified body is not heated and cooled by the temperature adjustment device, and sets the temperature adjustment plate to the lying state when the part or all of the solidified body including the upper surface of the solidified body is heated and cooled by the temperature adjustment device.

Here, the set temperature specifically refers to a molding temperature T1 and a cooling temperature T2.

According to the disclosure, the upper surface of the solidified body not only can be cooled but also can be heated by the temperature adjustment device arranged in the lamination molding apparatus, and the progress of the martensitic transformation can be further promoted. Furthermore, because the simple mechanism which switches the temperature adjustment plate between the upright state and the lying state is mounted, when the temperature adjustment of the upper surface of the solidified body is not performed, the temperature adjustment plate is set to the upright state, and when the temperature adjustment of the upper surface of the solidified body is performed, the temperature adjustment plate is set to the lying state. Thereby, the temperature adjustment of the upper surface of the solidified body can be appropriately performed without interfering with other steps.

In the lamination molding apparatus of the disclosure, the temperature adjustment plate has thermoelectric elements.

According to the disclosure, because the temperature adjustment plate is configured by the thermoelectric elements, the temperature adjustment plate can be switched from a heating state to a cooling state in a shorter time, and a solidified layer forming step can be performed quickly.

The lamination molding apparatus of the disclosure includes an attachment portion connecting the temperature adjustment plate and the revolving portion. The attachment portion includes a ball joint fixed to a back surface of the temperature adjustment plate and a receiving piece connected to the ball joint.

According to the disclosure, because the revolving portion and the temperature adjustment plate are slidably connected via the attachment portion, even when the parallelism of the solidified body is poor, the temperature adjustment plate can be reliably abutted against the upper surface of the solidified body, and the upper surface of the solidified body can be cooled uniformly and evenly.

In the lamination molding apparatus of the disclosure, the temperature adjustment device has a locking member to be connected to a drive device, and the locking member is a cylinder actioned to project a pin body and fit the pin body into a locking hole of the drive device when the temperature adjustment device is connected to the drive device. When a part or all of the solidified body including the upper surface of the solidified body is heated and cooled, the locking member is connected to the drive device, and by moving the drive device, the temperature adjustment device is moved from a retraction position away from the molding region to a processing position for heating and cooling which is adjacent to the molding region.

In addition, the lamination molding apparatus of the disclosure has the temperature adjustment device fixed to a back surface of a working door.

According to the disclosure, a structure can be adopted in which the temperature adjustment device is arranged in the processing position adjacent to the molding region when the temperature adjustment of the upper surface of the solidified body is performed, and the temperature adjustment device is arranged in the retraction position away from the molding region when the temperature adjustment of the upper surface of the solidified body is not performed. In addition, a structure can also be adopted in which the temperature adjustment device is fixed to the back surface of the working door.

By adopting the arrangement structure of the temperature adjustment device in this way, the temperature adjustment device does not interfere with other devices and other steps when the solidified layer forming step is performed.

In the lamination molding apparatus of the disclosure, the drive device is a recoater head which reciprocatively moves in a horizontal uniaxial direction and supplies and flattens a material powder to form the material layer, and the temperature adjustment device is connected to the recoater head and reciprocatively moves in the horizontal uniaxial direction.

According to the disclosure, because the drive mechanism for reciprocatively moving the temperature adjustment device also serves as a drive mechanism of the recoater head, it is not necessary to arrange an additional drive mechanism for the temperature adjustment device, and the function of the temperature adjustment device can be realized with a simpler structure.

According to the lamination molding apparatus of the disclosure, when the temperature adjustment of the solidified body is performed, the temperature adjustment plate which has been heated and cooled is set to the lying state and is abutted against the upper surface of the solidified body. Thereby the temperature of the solidified body can be increased or reduced more quickly, and the progress of the martensitic transformation can be promoted.

In addition, because the arrangement of the temperature adjustment plate can be switched from the upright state to the lying state, other steps such as a cutting step, loading and unloading of the three-dimensional molded object, or the like is not interfered with.

Furthermore, the lamination molding apparatus can be provided in which, by slidably connecting the temperature adjustment plate to the revolving portion, the temperature adjustment plate is inclined in accordance with the parallelism of the upper surface of the solidified body when the temperature adjustment plate is in the lying state, and thereby the temperature adjustment plate is steadily abutted against the upper surface of the solidified body, and the cooling can be uniformly performed.

1. First Embodiment

An embodiment of the disclosure is described below with reference to the drawings. Various feature items shown in the embodiment shown below can be combined with each other. In addition, each feature item independently constitutes an invention. In the following description, directions of an X-axis, a Y-axis, and a Z-axis are as defined in FIG. 1 and FIG. 2. Specifically, a predetermined horizontal uniaxial direction is referred to as the X-axis, another horizontal uniaxial direction orthogonal to the X-axis is referred to as the Y-axis, and a predetermined vertical uniaxial direction is referred to as the Z-axis.

In addition, in a lamination molding apparatus of the embodiment, a control axis in the horizontal uniaxial direction, which is a moving direction of a recoater head 11, is set as a B-axis, a horizontal uniaxial direction orthogonal to the B-axis of the recoater head 11 is set as a C-axis, and a control axis in a vertical uniaxial direction, which is a moving direction of a molding table 5, is set as a U-axis. Furthermore, in the machine of the lamination molding apparatus, a side where a working door 1c of a chamber 1 is arranged is set as an anterior surface or a front surface, a right-hand side toward the anterior surface is set as a right-side surface, a left-hand side is set as a left-side surface, and a rear side is set as a back surface. A dotted line in the diagram shows an irradiation path of a laser light L or a signal line.

(1.1 Lamination Molding Apparatus 100)

Figure 2:
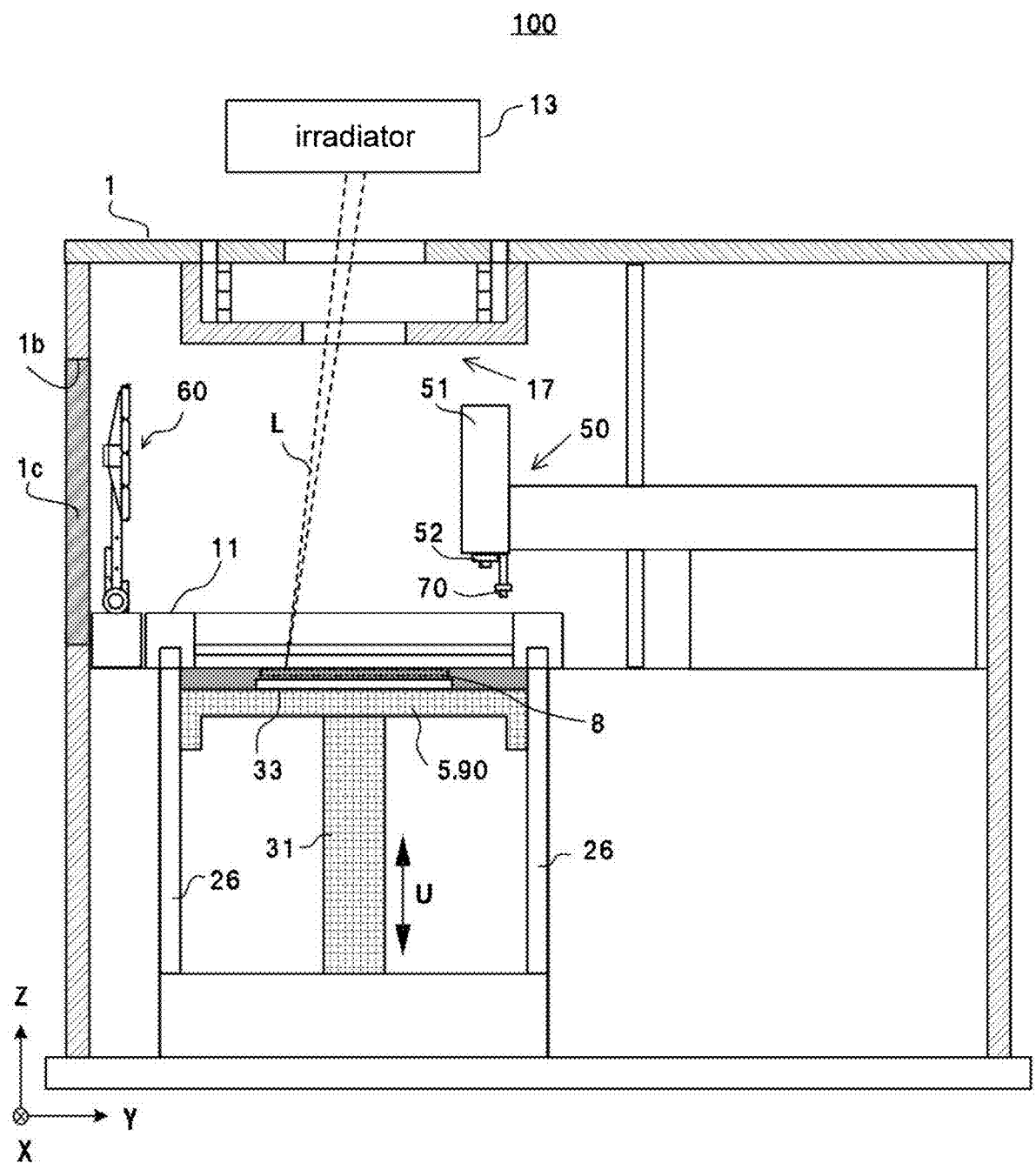
FIG. 2 is a schematic side view of the lamination molding apparatus 100 according to the embodiment of the disclosure.
Figure 3:
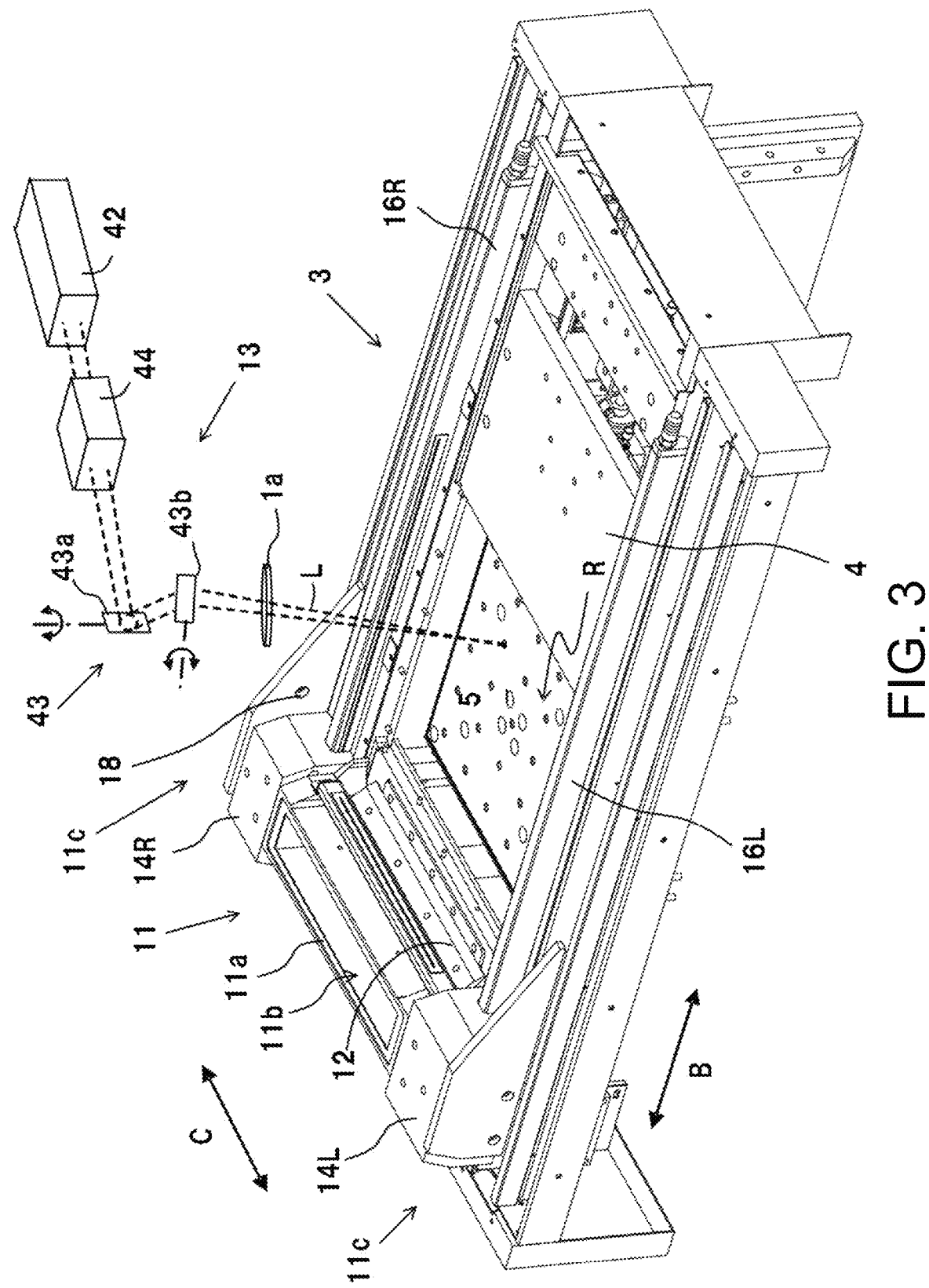
FIG. 3 is a schematic perspective view of a material layer forming device 3 and an irradiator 13 according to the embodiment of the disclosure.
Figure 5:
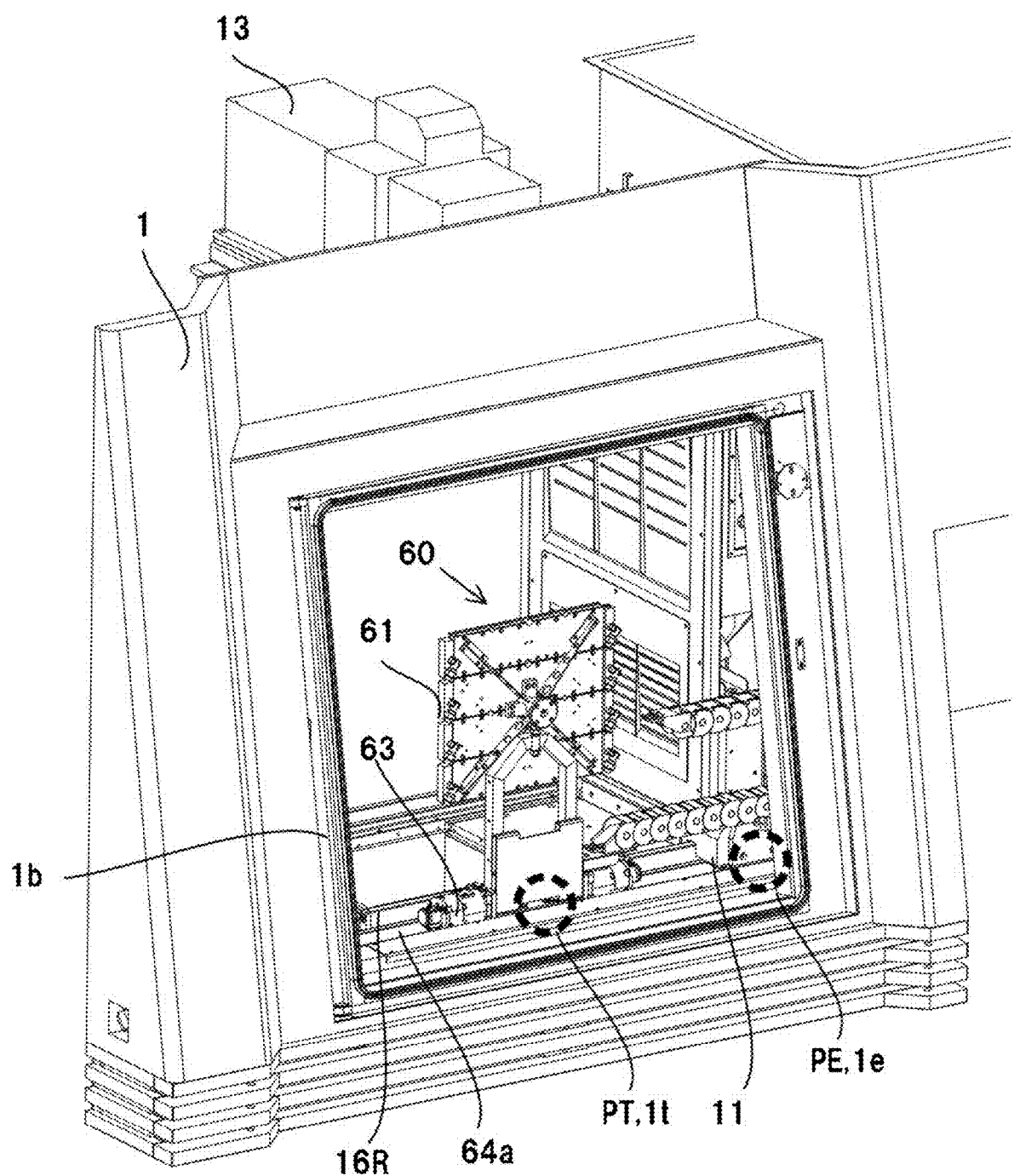
FIG. 5 is a front perspective view of a temperature adjustment device 60 according to the embodiment of the disclosure.
Figure 6:
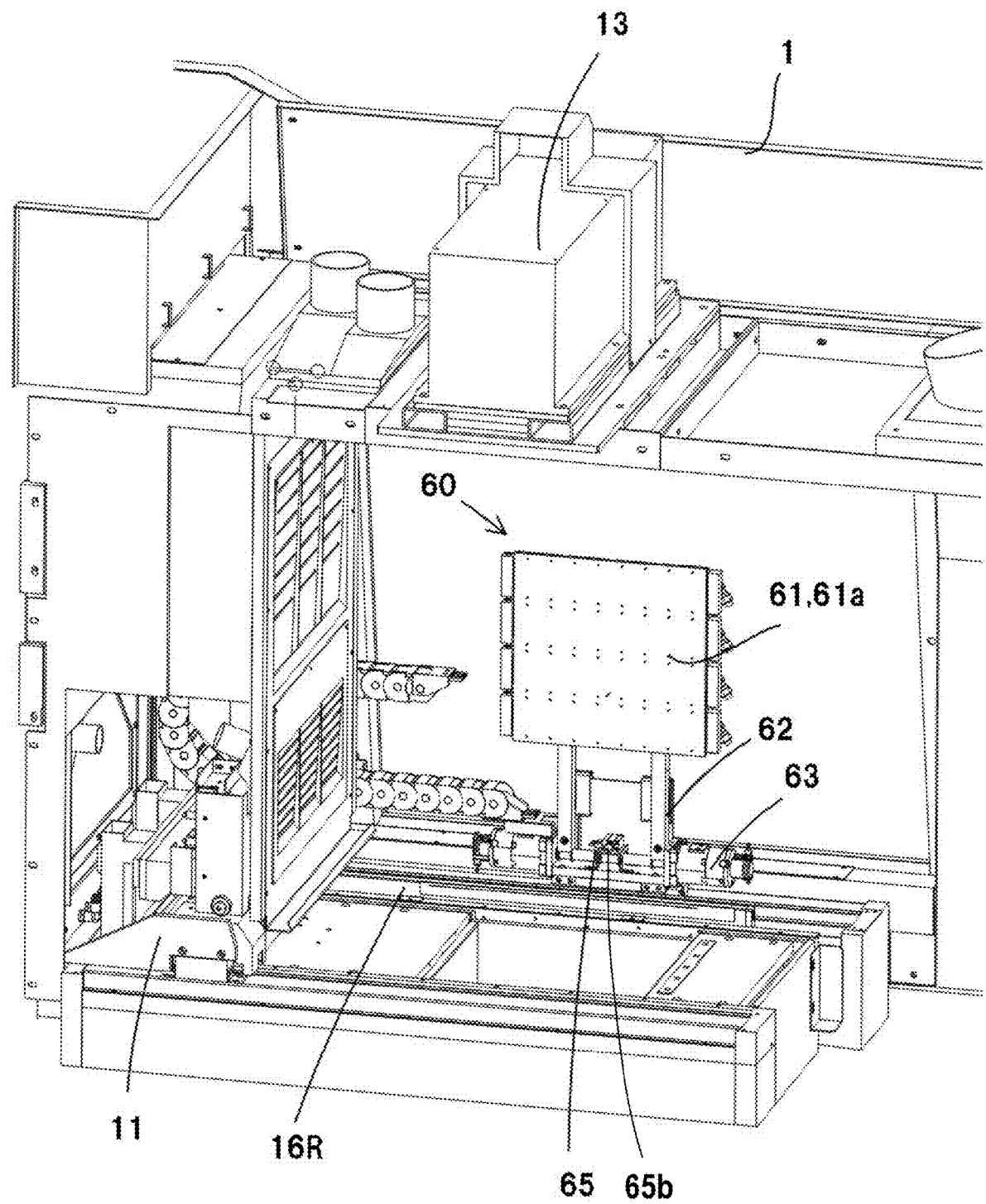
FIG. 6 is a rear perspective view of the temperature adjustment device 60 according to the embodiment of the disclosure.

FIG. 1 is a schematic front view of a lamination molding apparatus 100 according to a first embodiment of the disclosure, and FIG. 2 is a schematic side view of the lamination molding apparatus 100 according to the embodiment of the disclosure. FIG. 3 is a schematic perspective view of a material layer forming device 3 and an irradiator 13 according to the embodiment of the disclosure. FIG. 5 is a front perspective view of a temperature adjustment device 60 according to the embodiment of the disclosure, and FIG. 6 is a rear perspective view of the temperature adjustment device 60 according to the embodiment of the disclosure.

The lamination molding apparatus 100 according to the embodiment of the disclosure is a lamination molding apparatus which generates a three-dimensional molded object having a desired shape by laminating a plurality of solidified layers in a manner of repeating steps in which a material layer 8 is formed, and a beam which is, for example, the laser light L, is irradiated to an irradiation region of the material layer 8 to melt or sinter the irradiation region of the material layer 8.

The lamination molding apparatus 100 of the disclosure includes the chamber 1, an inert gas supply device 15, a protection window pollution prevention device 17, a fume collector 19, a molding table 5, the irradiator 13, the material layer forming device 3, a control device 40, a cutting device 50, the temperature adjustment device 60, a temperature measurement unit 70, and a table temperature adjustment device 90. The chamber 1 covers a predetermined molding region R and is filled with an inert gas having a predetermined concentration.

The chamber 1 is a housing body of the lamination molding apparatus 100, and inside the chamber 1, the material layer forming device 3 is arranged which forms a material layer for each of a plurality of divided layers obtained by dividing a desired three-dimensional molded object at a predetermined height in the molding region R. A formed opening 1b is arranged in an anterior surface of the chamber 1, and the working door 1c having a viewing window is arranged in the opening 1b (FIG. 2).

The working door 1c may be revolvably arranged in the opening 1b in a hinge opening/closing type, or may be formed into a left-right or up-down slide type. By opening or closing the working door 1c, the taking out of the three-dimensional molded object, the removal of an unsintered material powder, and the like can be performed.

The temperature adjustment device 60 described later is arranged on a back surface of the working door 1c to be capable of moving backward and forward in the B-axis direction along an inner side surface of the chamber 1 (FIG. 2).

Figure 7:
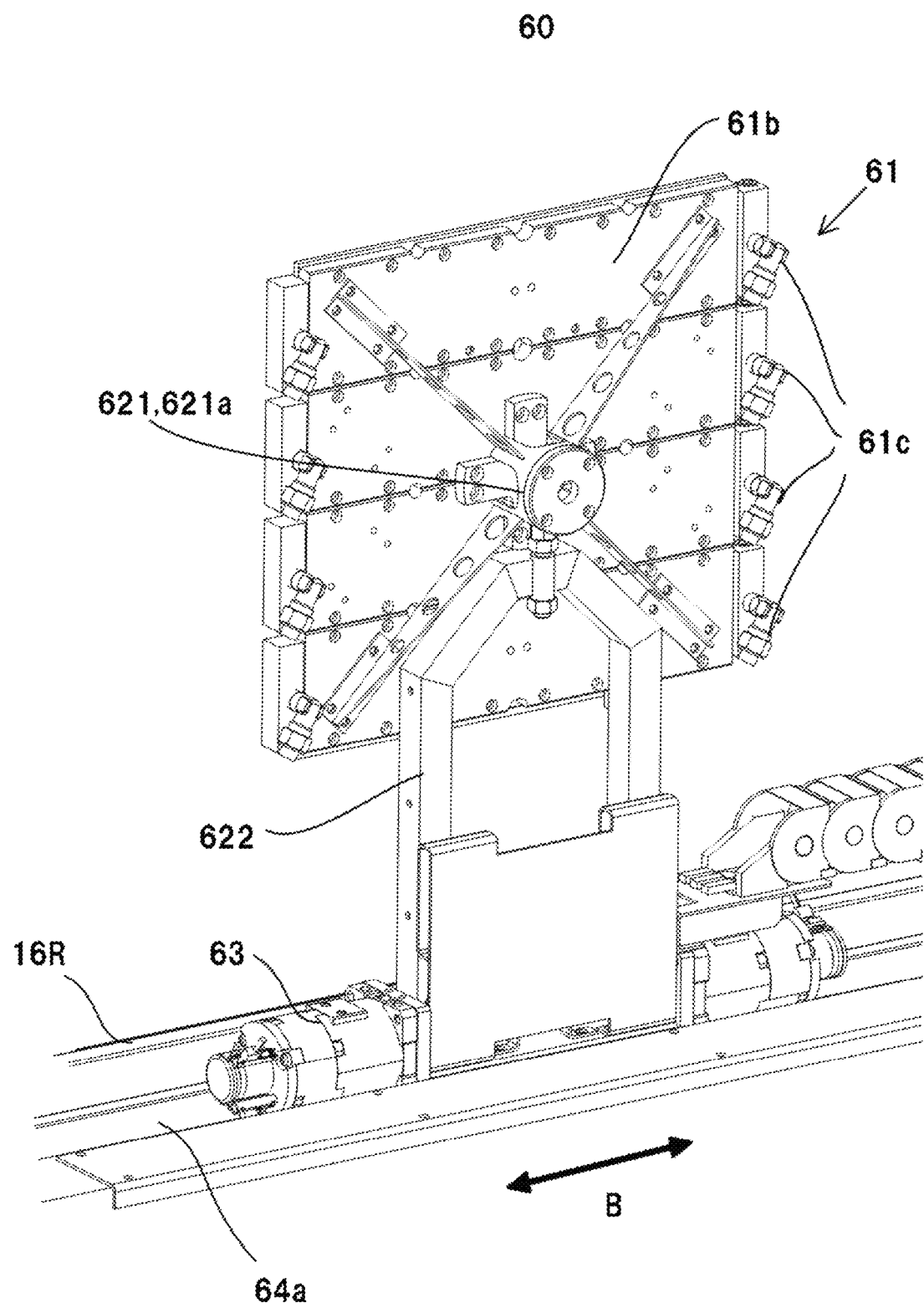
FIG. 7 is an enlarged front perspective view of the temperature adjustment device 60 according to the embodiment of the disclosure.

Specifically, a guide rail for temperature adjustment device 64a is arranged in close proximity to a guide rail 16R of the recoater head 11 described later in a manner of being parallel to the guide rail 16R along the B-axis direction, which is a moving direction of the recoater head 11 (FIG. 5 and FIG. 7). One end of the guide rail for temperature adjustment device 64a extends to a position which is away from the molding region R and retracts from the back surface of the working door 1c (a retraction position PE), and the other end is arranged extending to a processing position which is adjacent to the molding region R and is used for heating and cooling an upper surface of the solidified body 81 (a heating/cooling position PT).

When the temperature adjustment device 60 moves in the B-axis direction, the temperature adjustment device 60 and the recoater head 11 are connected, the recoater head 11 becomes a drive device for the temperature adjustment device 60, and the temperature adjustment device 60 reciprocatively moves in the B-axis direction by a drive force of the recoater head 11.

In addition, a locking member for retraction position 1e is arranged at the retraction position PE (FIG. 5) of the temperature adjustment device 60 in the chamber 1, and a locking member for heating/cooling position 1t is arranged at the heating/cooling position PT (FIG. 5).

The locking member for retraction position 1e and the locking member for heating/cooling position 1t are members for engaging with a position fixing hole 66 of the temperature adjustment device 60. The locking member for retraction position 1e and the locking member for heating/cooling position 1t are, for example, fluid pressure cylinders and electric cylinders. The locking member for retraction position 1e and the locking member for heating/cooling position 1t include a pin body, and the pin body can freely advance to and retract from the position fixing hole 66 of the temperature adjustment device 60 by an action of the cylinder. When the temperature adjustment device 60 is in a standby state or in the heating/cooling processing, the cylinder is actioned to project the pin body, and the pin body is inserted and fitted into the position fixing hole 66 to fix the temperature adjustment device 60 to the chamber 1. On the other hand, when the temperature adjustment device 60 is moved, the cylinder is actioned to withdraw the pin body and pull out the pin body from the position fixing hole 66, and the connection with the chamber 1 is released.

The material layer forming device 3 has a base 4 and the recoater head 11. In the embodiment, the material forming the material layer 8 is made of a material powder. The material powder is, for example, a metal powder, and has, for example, a spherical shape having an average particle size of 20 µm.

The base 4 has the molding region R in which the desired three-dimensional molded object is formed. The molding region R is arranged on the molding table 5. The molding table 5 is driven by a molding table drive mechanism 31 and can move in an up-down direction (the U-axis direction shown by an arrow in FIG. 1). In the embodiment, when the lamination molding apparatus is used, a base plate 33 is arranged on the molding table 5, and a material layer 8 which is the first layer is formed on the base plate 33. Moreover, the irradiation region of the material layer 8 exists in the molding region R and almost coincides with a region defined by a contour shape of the desired three-dimensional molded object.

A powder holding wall 26 is arranged around the molding table 5. An unsolidified material powder is held in a powder holding space surrounded by the powder holding wall 26 and the molding table 5. A powder discharge portion capable of discharging the material powder in the powder holding space may be arranged on a lower side of the powder holding wall 26.

Figure 4:
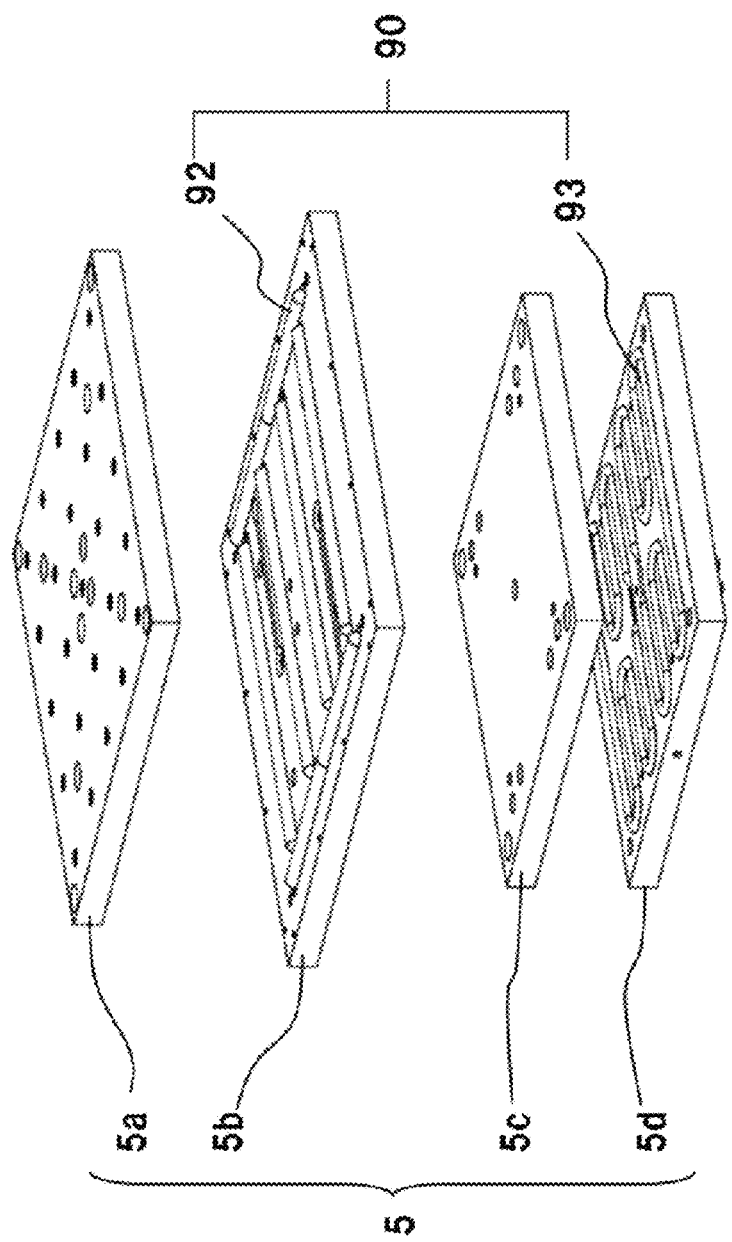
FIG. 4 is a schematic configuration diagram of a molding table 5 including a table temperature adjustment device 90 according to the embodiment of the disclosure.

The table temperature adjustment device 90 for adjusting a temperature of the molding table 5 is arranged inside the molding table 5. As shown in FIG. 4, the molding table 5 including the table temperature adjustment device 90 includes a top plate 5a and three support plates 5b, 5c, and 5d. A heater 92 capable of heating the top plate 5a is arranged between the top plate 5a and the support plate 5b adjacent the top plate 5a. In addition, a cooler 93 capable of cooling the top plate 5a is arranged between two support plates 5c and 5d on a lower side of the support plate 5b. The molding table 5 is configured to be capable of adjusting the temperature by the heater 92 and the cooler 93, and the heater 92 and the cooler 93 configure the table temperature adjustment device 90. Moreover, in order to prevent thermal displacement of the molding table drive mechanism 31, a constant temperature portion which is maintained at a constant temperature may be arranged between the table temperature adjustment device 90 and the molding table drive mechanism 31. By configuring the table temperature adjustment device 90 as described above, a lower solidified layer and the base plate 33 which is in contact with the top plate 5a of the molding table 5 set to a desired temperature can be adjusted to a desired temperature. Moreover, the material layer 8 is desired to be preheated to a predetermined temperature when the material layer 8 is sintered or melted, and the table temperature adjustment device 90 acts as a preheating device of the material layer 8.

The recoater head 11 shown in FIG. 3 has a material accommodation portion 11a, a material supply portion 11b, a material discharge portion (not shown), and a guide mechanism 11c. The material accommodation portion 11a accommodates the material powder. The material supply portion 11b is arranged on an upper surface of the material accommodation portion 11a, and is a receiving port for the material powder supplied from a material supply device (not shown) to the material accommodation portion 11a. The material discharge portion is arranged on a bottom surface of the material accommodation portion 11a and discharges the material powder in the material accommodation portion 11a. The material discharge portion is configured in a slit shape extending in the horizontal uniaxial direction (the C-axis direction shown by an arrow) orthogonal to the moving direction (the B-axis direction shown by an arrow) of the recoater head 11. In addition, blades 12 are respectively arranged on both side surfaces of the recoater head 11. The blade 12 flattens the material powder discharged from the material discharge portion to form the material layer 8.

The guide mechanism 11c is configured by a pair of bearings 14R and 14L, guide rails 16R and 16L which are a pair of shaft members respectively received by each of the bearings 14R and 14L, and a servomotor (not shown). The recoater head 11 reciprocatively moves on the molding table 5 in the B-axis direction along the guide rails 16R and 16L of the guide mechanism 11c by the servomotor based on a scanning command of the control device 40.

In addition, a locking hole 18 for fixing the temperature adjustment device 60 to the recoater head 11 is arranged on a side plate of the bearing 14R of the guide mechanism 11c. The locking hole 18 may have a shape engaging with a transport locking member 65 arranged in the temperature adjustment device 60, and may be, for example, a groove, a non-through hole, a through hole, or the like.

An inert gas having a predetermined concentration is supplied to the chamber 1, and the inert gas containing fume generated when the material layer 8 is melted is discharged. The inert gas discharged from the chamber 1 may be returned to the chamber 1 with the fume removed. Specifically, the inert gas supply device 15 is connected to the chamber 1, and the fume collector 19 is connected to the chamber 1 via duct boxes 21 and 23. The position and the number of the supply port and the discharge port of the inert gas which are arranged in the chamber 1 are not particularly limited. Moreover, in the disclosure, the inert gas refers to a gas that does not substantially react with the material, and an appropriate inert gas is selected from a nitrogen gas, an argon gas, a helium gas, and the like according to the type of the material.

The inert gas supply device 15 has a function of supplying the inert gas, and is, for example, an inert gas generation device which generates the inert gas having the predetermined concentration from the surrounding air or a gas cylinder in which the inert gas having the predetermined concentration is stored. As the inert gas generation device, inert gas generation devices in various methods, such as a membrane separation method, a PSA method, and the like, can be adopted according to the type and the concentration of the generated inert gas. The inert gas supply device 15 supplies the inert gas from the supply port arranged in the chamber 1, and fills the inside of the chamber 1 with the inert gas having the predetermined concentration. Here, the inert gas supplied from the inert gas supply device 15 is desired to be dry. Specifically, a dew point temperature of the inert gas is desired to be lower than the temperature of the temperature adjustment device 60. Because a temperature adjustment plate 61 described later of the temperature adjustment device 60 moves in the chamber 1, if the inside of the chamber 1 is filled with the inert gas, the dew condensation of the temperature adjustment plate 61 can be suppressed. That is, when the inert gas supply device 15 is an inert gas generation device, a drying device which dries the air used as the raw material for generating the inert gas is desired to be arranged. In addition, when the inert gas supply device 15 is a gas cylinder, a gas cylinder in which the inert gas that has been sufficiently dried is stored is desired to be used.

The inert gas which is discharged from the discharge port of the chamber 1 and includes a large amount of fume is sent to the fume collector 19, and after the fume is removed, the inert gas is returned to the chamber 1. The fume collector 19 may have a function of removing the fume, and is, for example, an electrostatic precipitator or a filter.

The cutting device 50 includes a machining head 51 in which a spindle head 52 is arranged, and the machining head 51 moves the spindle head 52 to a desired position by a machining head drive mechanism (not shown).

The spindle head 52 is configured to be capable of gripping and rotating cutting tools (not shown) such as an end mill and the like, and can perform cutting machining on the surface and the unnecessary part of the solidified layer obtained by sintering the material layer 8. The cutting tools may be a plurality of types of cutting tools, and the used cutting tool can also be replaced during molding by an automatic tool replacement device (not shown). By the above configuration, the machining head 51 can perform the cutting machining on the solidified layer at an arbitrary position in the chamber 1.

The irradiator 13 is arranged above the chamber 1. The irradiator 13 irradiates a beam such as the laser light L or the like to the predetermined section of the material layer 8 which is formed on the molding region R to melt or sinter the material layer 8 at the irradiation position, thereby forming the solidified layer. As shown in FIG. 3, the irradiator 13 has a light source 42, a two-axis galvano scanner 43, and a focus control unit 44. Moreover, the galvano scanner 43 includes galvano mirrors 43a and 43b and actuators (not shown) which respectively rotate the galvano mirrors 43a and 43b.

The light source 42 irradiates the laser light L. Here, the laser light L is a laser capable of melting the material powder, and is, for example, a $CO_2$ laser, a fiber laser, a YAG laser, or the like. Moreover, the light source 42 may irradiate an electron beam.

The focus control unit 44 collects the laser light L output by the light source 42 and adjusts the laser light L to a desired spot diameter. The galvano mirrors 43a and 43b controllably scan the laser light L output by the light source 42 in a two-dimensional manner. Rotation angles of the galvano mirrors 43a and 43b are respectively controlled according to the magnitude of a rotation angle control signal input from the control device 40. According to this feature, the laser light L can be irradiated to the desired position by changing the magnitude of the rotation angle control signal input to each actuator of the galvano scanner.

The laser light L passing through the galvano mirrors 43a and 43b penetrates a protection window 1a arranged in the chamber 1 and is irradiated to the material layer 8 formed in the molding region R. The protection window 1a is formed by a material which the laser light L can penetrate. For example, when the laser light L is a fiber laser or a YAG laser, the protection window 1a can be configured by quartz glass.

The protection window pollution prevention device 17 is arranged on an upper surface of the chamber 1 in a manner of covering the protection window 1a. The protection window pollution prevention device 17 includes a cylindrical housing body 17a and a cylindrical diffusion member 17c arranged in the housing body 17a. An inert gas supply space 17d is arranged between the housing body 17a and the diffusion member 17c. In addition, on a bottom surface of the housing body 17a, an opening portion 17b is arranged on an inner side of the diffusion member 17c. A large number of fine holes 17e are arranged in the diffusion member 17c, and the clean inert gas supplied to the inert gas supply space 17d fills a clean room 17f through the fine holes 17e. Besides, the clean inert gas filled in the clean room 17f is ejected toward the bottom of the protection window pollution prevention device 17 through the opening portion 17b.

The control device 40 performs overall control of the entire lamination molding apparatus 100, and the control device 40 receives molding data generated in a CAM device (not shown), and performs numerical value control of controlling the laminate molding based on the received data. In addition, the control device 40 also serves as a device which performs the drive control of the material layer forming device 3, the molding table 5, the recoater head 11, the irradiator 13, the inert gas supply device 15, the fume collector 19, the cutting device 50, the temperature adjustment device 60, the temperature measurement unit 70, the table temperature adjustment device 90, and the like.

Figure 14:
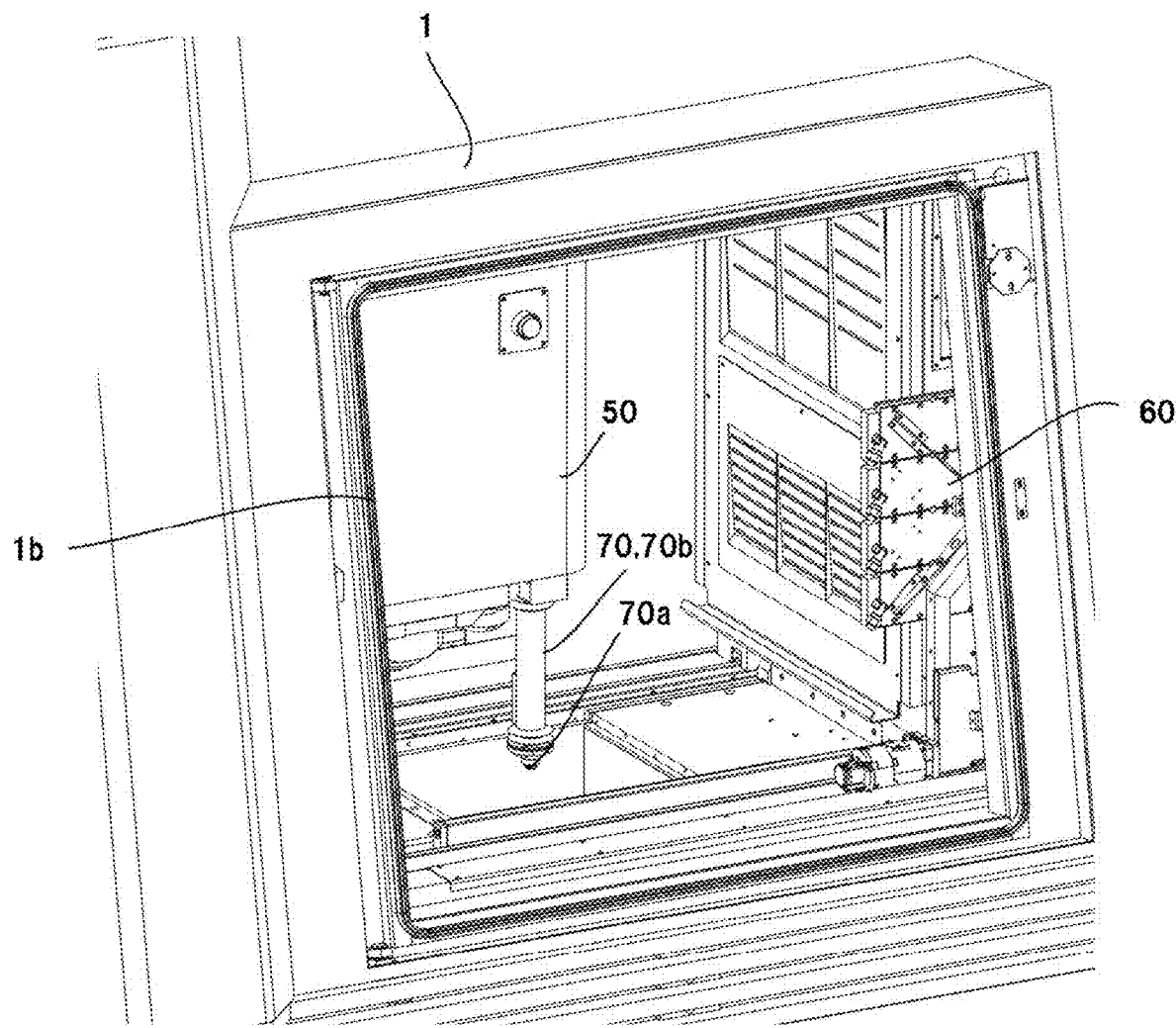
FIG. 14 is an illustration diagram (a temperature detection step) of the solidified layer forming step using the lamination molding apparatus 100 according to the embodiment of the disclosure.

The temperature measurement unit 70 is a detection unit which measures the temperature of the solidified body 81, and is attached to the cutting device 50 and used (FIG. 2 and FIG. 14). For example, the temperature measurement unit 70 includes a contact type temperature sensor 70a which contacts the upper surface of the solidified body 81 and measures the temperature, and a temperature sensor elevating device 70b which moves the temperature sensor 70a in the vertical direction. The temperature sensor 70a is, for example, a thermocouple, and other temperature sensors such as a resistance temperature detector and the like may be used. The temperature sensor elevating device 70b is, for example, an air cylinder, and other drive mechanisms such as a hydraulic cylinder, an electric motor, and the like may be used. In addition, the temperature measurement unit 70 may also be configured by a non-contact type temperature sensor, and the temperature of the solidified body 81 can be measured more accurately by using the contact type temperature sensor 70a. By using the temperature measurement unit 70, feedback control corresponding to the temperature of the solidified body 81 can be performed. For example, the temperature measurement unit 70 can be configured to carry out a cooling step or a heating step performed by the temperature adjustment plate 61 until the temperature measured by the temperature sensor 70a reaches a predetermined temperature.

The temperature measurement unit 70 is not an essential component and may be omitted.

(1.2 Temperature Adjustment Device 60)

Figure 8:
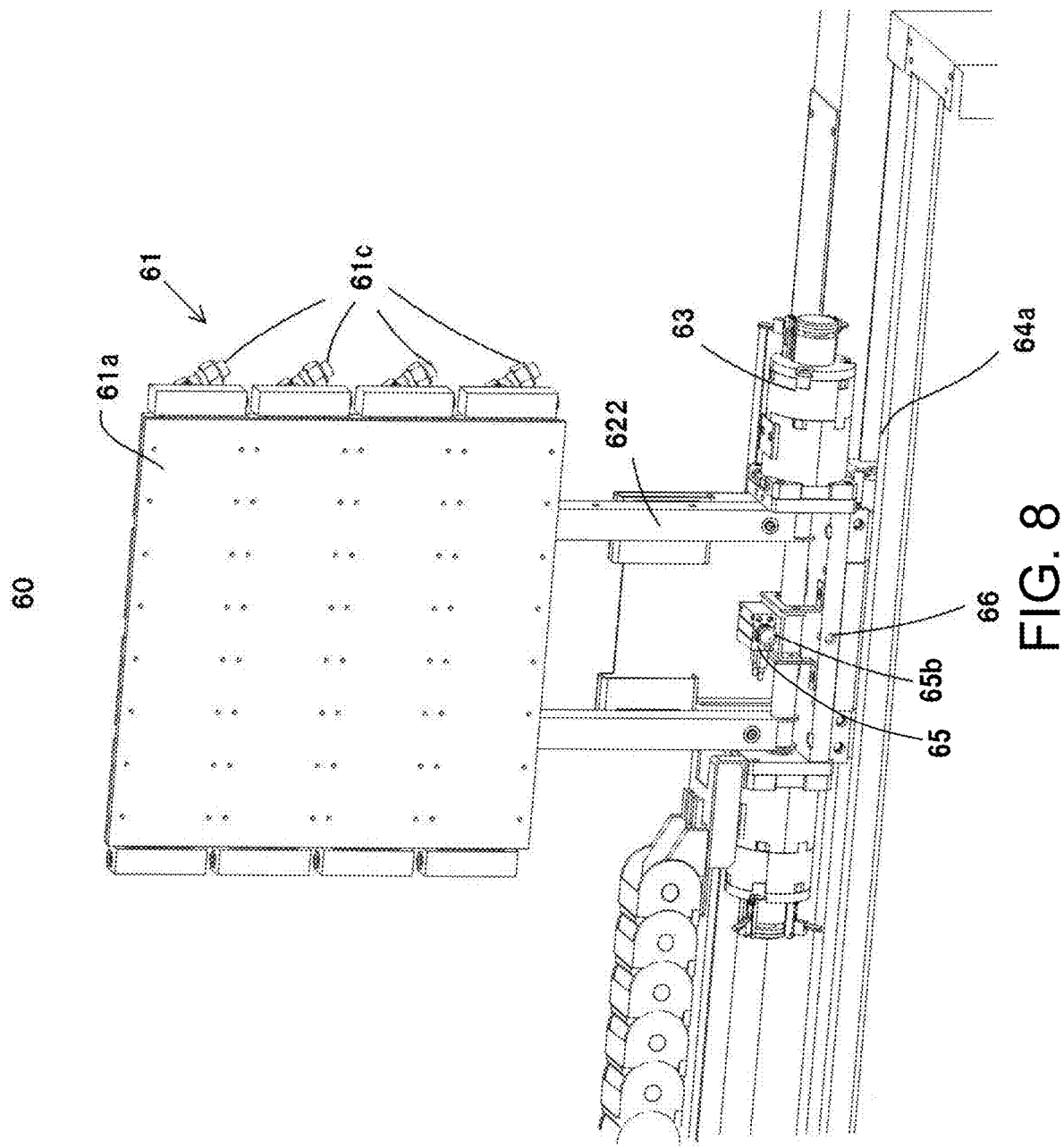
FIG. 8 is an enlarged rear perspective view of the temperature adjustment device 60 according to the embodiment of the disclosure.

FIG. 7 is an enlarged front perspective view of the temperature adjustment device 60 according to the embodiment of the disclosure, and FIG. 8 is an enlarged rear perspective view of the temperature adjustment device 60 according to the embodiment of the disclosure. Moreover, in FIGS. 7 to 9, a part of components of the lamination molding apparatus 100 such as the working door 1c and the like are omitted in consideration of visibility.

The temperature adjustment device 60 according to the embodiment of the disclosure is a device for cooling or heating the three-dimensional molded object by bringing the temperature adjustment plate 61 into close contact with the upper surface of the solidified layer obtained by sintering the material layer 8. The temperature adjustment device 60 is arranged on the back surface of the working door 1c between an inner wall of the chamber 1 on a front surface side and the recoater head 11, and is arranged in a manner of engaging with the recoater head 11 to be capable of reciprocatively moving in the B-axis direction (FIG. 1 and FIG. 7).

The temperature adjustment device 60 is configured by the temperature adjustment plate 61, an attachment portion 62, a revolving portion 63, the transport locking member 65, and the position fixing hole 66.

The temperature adjustment plate 61 is a flat plate shape member which is in close contact with the upper surface of the solidified body 81 formed by laminating the solidified layers which are formed by irradiating the beam such as the laser light L or the like to the material layer 8, and heats and cools the upper surface of the solidified body 81. The temperature adjustment plate 61 is configured by a heating/cooling plate 61a, thermoelectric elements 61b, and a lead wire connection portion 61c. Moreover, the upper surface of the solidified body 81 means an upper surface of the uppermost solidified layer at the time when heating and cooling are performed by the temperature adjustment device 60.

The heating/cooling plate 61a is a substrate which actually contacts the upper surface of the solidified body 81, and functions as a contact surface for heating and cooling the solidified body 81. The heating/cooling plate 61a is formed by an insulating substrate such as a ceramic material or the like.

The thermoelectric element 61b is an element that converts electric energy into heat energy, and a plurality of the thermoelectric elements 61b are arranged in an array on a back surface of the heating/cooling plate 61a. As the thermoelectric element 61b, for example, a semiconductor thermoelectric element such as a Peltier element or the like is used. When a direct current flows through the lead wire connection portion 61c, the thermoelectric element 61b cools (absorbs heat) at one end surface connected to the heating/cooling plate 61a, and generates heat (heats) at the other end surface. When the direction of the direct current is changed, the cooling surface and the heating surface are switched, and the switching between heating and cooling can be performed in a short time. By performing the cooling and the heating at one surface of the thermoelectric element 61b in this way, the upper surface of the solidified body 81 can be heated and cooled via the heating/cooling plate 61a, and highly precise and quick temperature management can be realized.

The lead wire connection portion 61c is a terminal for connecting the thermoelectric element 61b and a lead wire (not shown).

Figure 9:
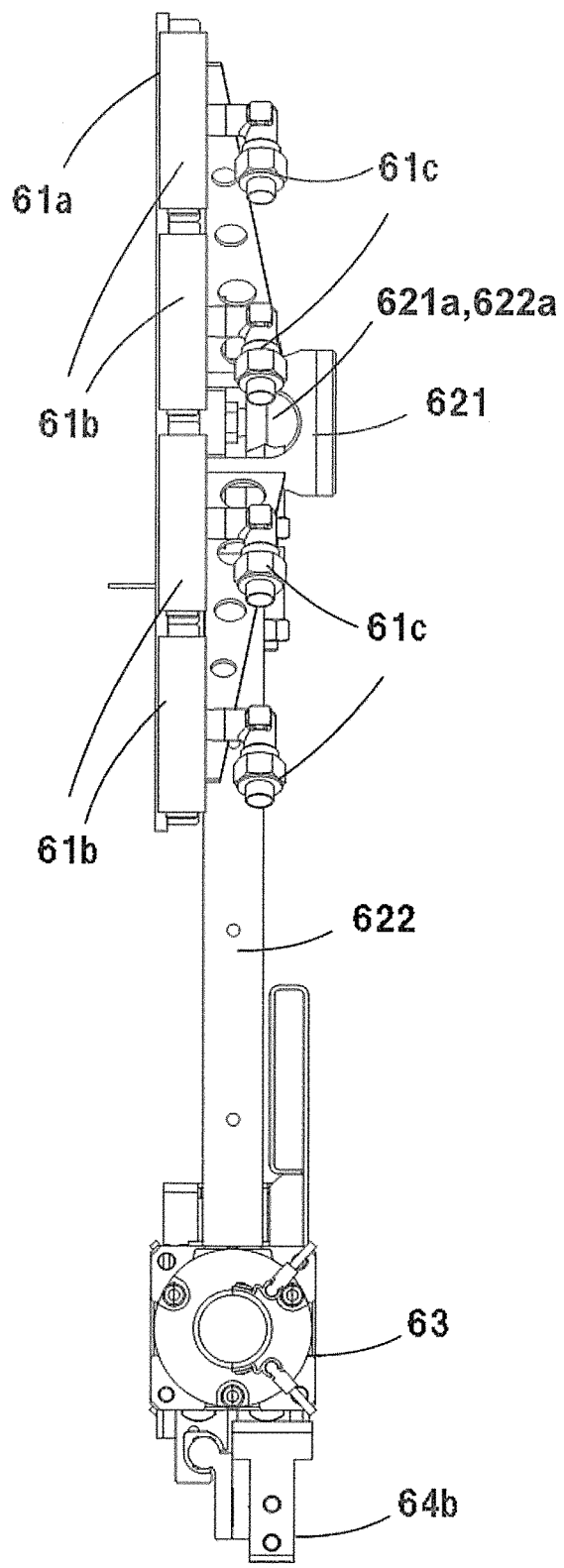
FIG. 9 is a side view of the temperature adjustment device 60 when a temperature adjustment plate 61 according to the embodiment of the disclosure is in an upright state.
Figure 10:
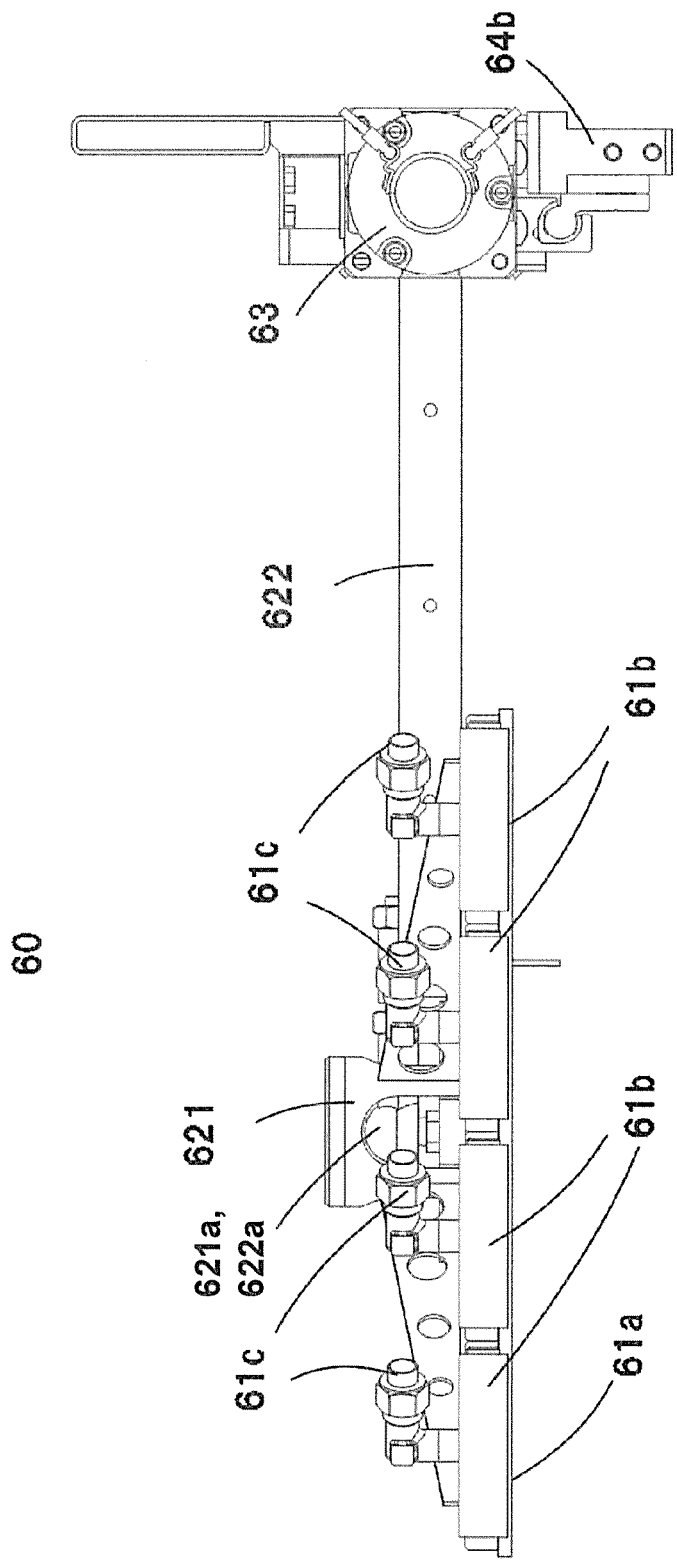
FIG. 10 is a side view of the temperature adjustment device 60 when the temperature adjustment plate 61 according to the embodiment of the disclosure is in a lying state.

FIG. 9 is a side view of the temperature adjustment device 60 in which the temperature adjustment plate 61 according to the embodiment of the disclosure is in an upright state, and FIG. 10 is a side view of the temperature adjustment device 60 in which the temperature adjustment plate 61 according to the embodiment of the disclosure is in a lying state.

The revolving portion 63 is a member which revolves the temperature adjustment plate 61 between the lying state in which the temperature adjustment plate 61 lies down along the horizontal direction (a direction parallel to an XY plane) and the upright state in which the temperature adjustment plate 61 stand upright along the vertical direction (a Z direction). When the temperature adjustment by the temperature adjustment device 60 is not performed, the temperature adjustment plate 61 is set to the upright state shown in FIG. 9. When the temperature adjustment by the temperature adjustment device 60 is performed, the temperature adjustment plate 61 is set to the lying state shown in FIG. 10. In this way, when the solidified layer is formed by the irradiator 13, when the solidified layer is machined by the cutting device 50, when the material layer 8 is formed on the base plate 33 by the recoater head 11, and in other cases, each device of the lamination molding apparatus 100 and the temperature adjustment plate 61 can be prevented from interfering with each other.

The revolving portion 63 is, for example, an air rotary actuator. As the revolving portion 63, other revolving mechanisms such as a hydraulic rotary actuator, an electric rotary actuator, and the like may be used.

The attachment portion 62 is a member for connecting the temperature adjustment plate 61 and the revolving portion 63, and is configured by a back surface attachment portion 621 and a lower attachment portion 622.

The back surface attachment portion 621 is fixed to a back surface of the thermoelectric element 61b, and a ball joint 621a is arranged at the center position of the thermoelectric element 61b. A lower end of the lower attachment portion 622 is fixed to a rotation shaft of the revolving portion 63 and is erected in the vertical direction, and a receiving piece 622a connected to the ball joint 621a is arranged at an upper end of the lower attachment portion 622.

An abutting surface between the ball joint 621a and the receiving piece 622a is formed to slide freely, and the revolving portion 63 and the temperature adjustment plate 61 are slidably connected via the attachment portion 62.

By using this connection structure between the revolving portion 63 and the temperature adjustment plate 61, even when a parallelism of the upper surface of the solidified body 81 is poor, the temperature adjustment plate 61 can be appropriately abutted against the upper surface of the solidified body 81, and an excessive force can be avoided to be applied to either the temperature adjustment plate 61 or the upper surface of the solidified body 81.

In addition, a slider 64b is fixed to a bottom surface of the revolving portion 63, and the slider 64b slides along the guide rail for temperature adjustment device 64a. Moreover, as the slider 64b, a known slider can be properly used, and the temperature adjustment device 60 reciprocatively moves in the B-axis direction in a manner of being connected to the recoater head 11.

The transport locking member 65 is a member for engaging with the locking hole 18 of the recoater head 11, and for example, a known fluid pressure cylinder or a known electric cylinder is used. The transport locking member 65 is arranged at a position which is below the temperature adjustment device 60 when the temperature adjustment plate 61 is in the upright state and can be engaged with the locking hole 18 of the recoater head 11.

A cylinder 65, which is the transport locking member 65, includes a pin body 65b, and the pin body 65b can freely advance to and retract from the locking hole 18 of the recoater head 11 by the action of the cylinder 65. When the temperature adjustment device 60 is connected to the recoater head 11, the cylinder 65 is actioned to project the pin body 65b, and the pin body 65b is inserted and fitted into the locking hole 18 of the recoater head 11. In addition, when the connection between the temperature adjustment device 60 and the recoater head 11 is released, the cylinder 65 is actioned to withdraw the pin body 65b and pull out the pin body 65b from the locking hole 18 of the recoater head 11.

The position fixing hole 66 is a hole for fixing the temperature adjustment device 60 to the retraction position PE and the processing position PT for performing the heating and the cooling, and the position fixing hole 66 is arranged below the temperature adjustment device 60 (FIG. 8). The position fixing hole 66 may have a shape engaging with the locking member for retraction position 1e and the locking member for heating/cooling position 1t, and may be, for example, a groove, a non-through hole, a through hole, or the like.

(1.3 Manufacturing Method of Three-Dimensional Molded Object)

Figure 11:
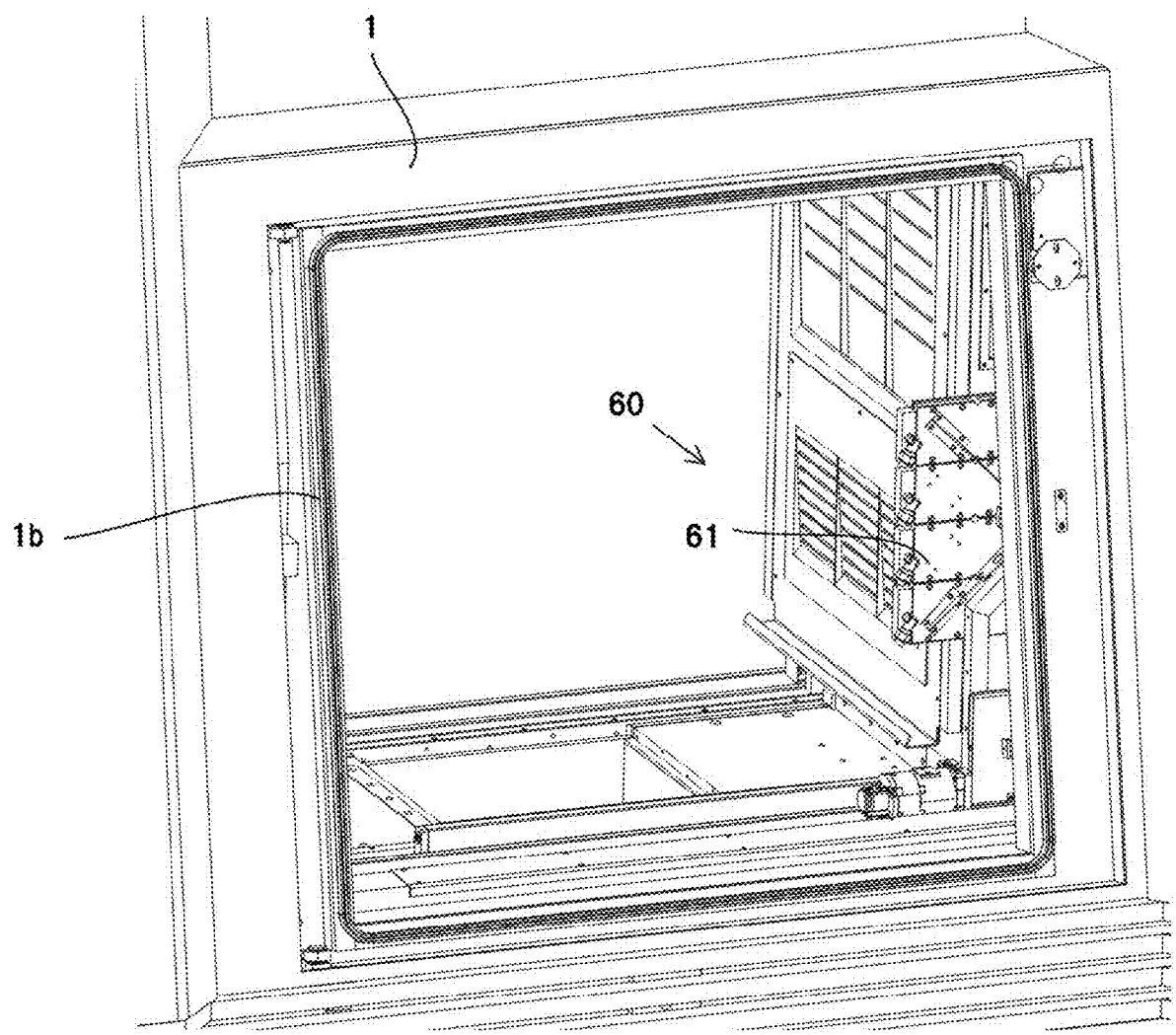
FIG. 11 is an illustration diagram (a standby state) of a solidified layer forming step using the lamination molding apparatus 100 according to the embodiment of the disclosure.
Figure 12:
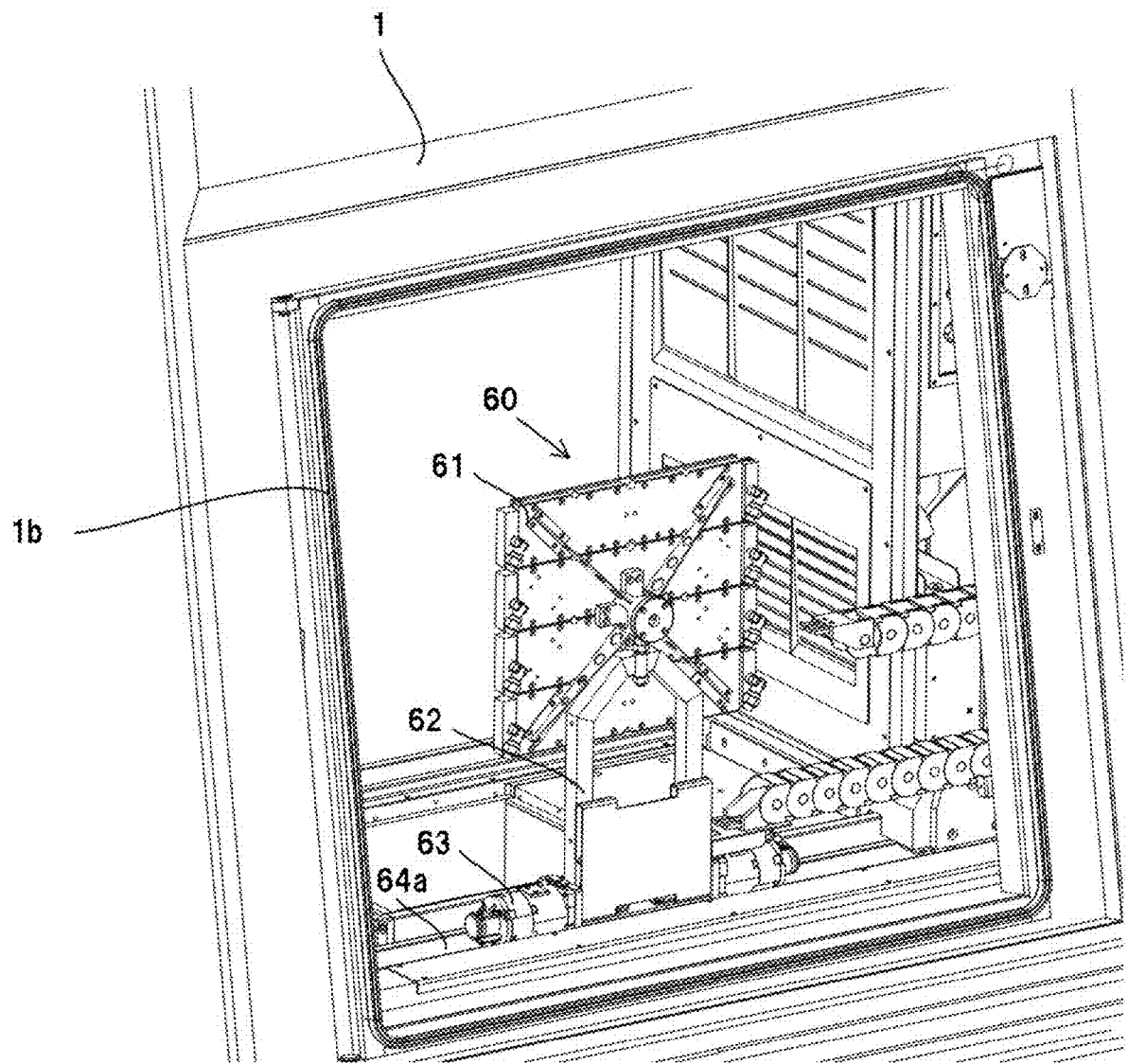
FIG. 12 is an illustration diagram (a state before rotation) of the solidified layer forming step using the lamination molding apparatus 100 according to the embodiment of the disclosure.
Figure 13:
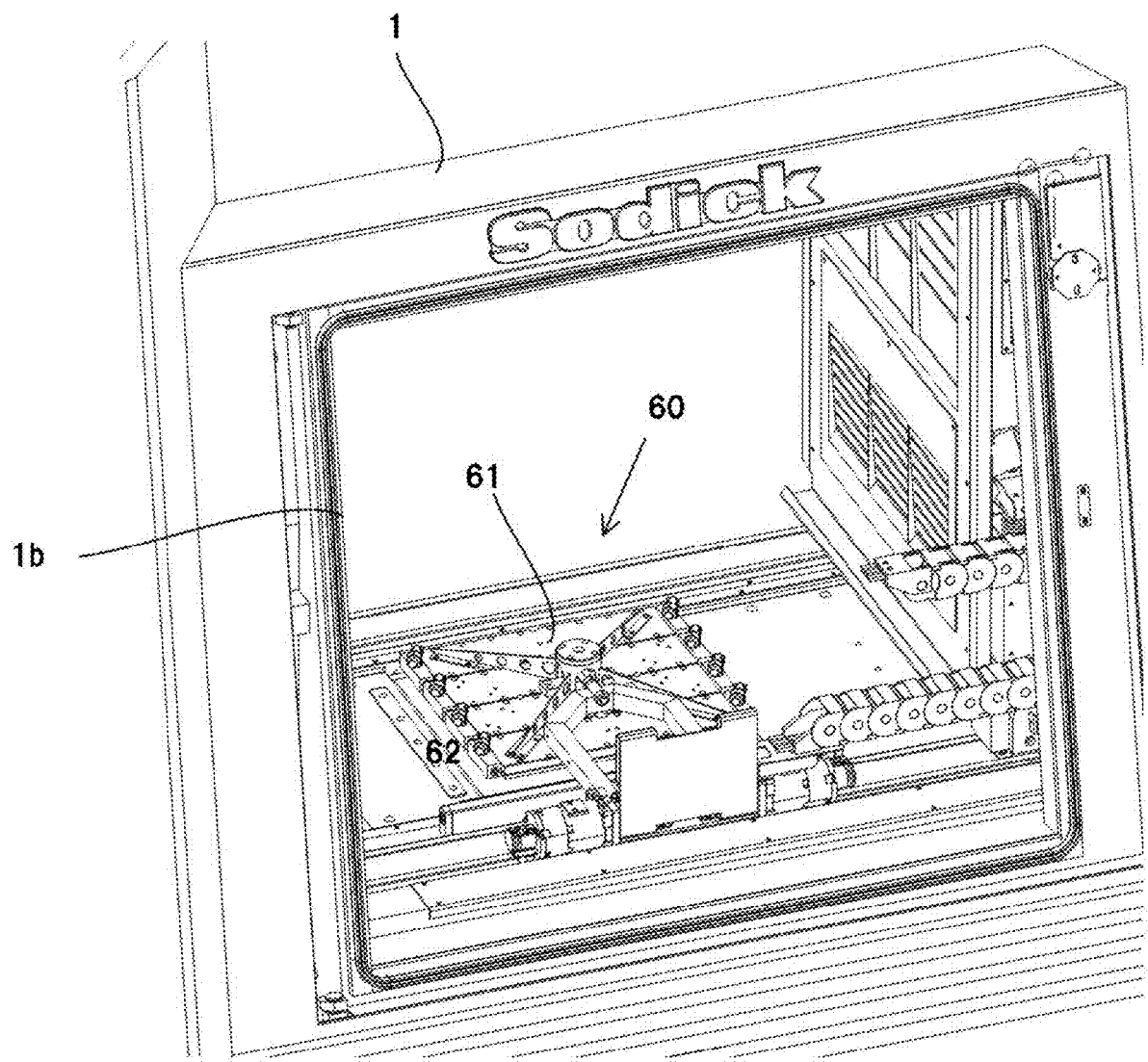
FIG. 13 is an illustration diagram (a state after rotation) of the solidified layer forming step using the lamination molding apparatus 100 according to the embodiment of the disclosure.
Figure 15:
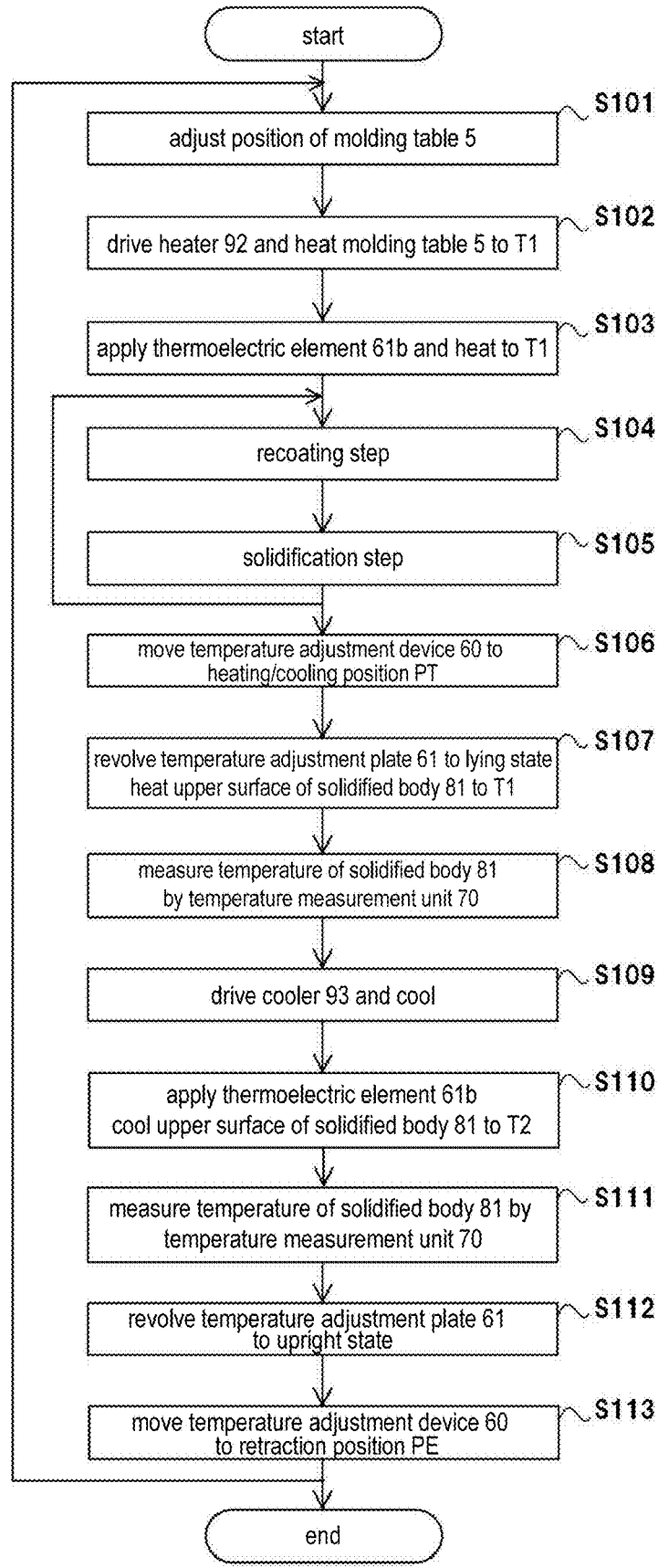
FIG. 15 is a flow diagram showing the solidified layer forming step using the lamination molding apparatus 100 according to the embodiment of the disclosure.

FIG. 11 is an illustration diagram (a standby state) of a solidified layer forming step using the lamination molding apparatus 100 according to the embodiment of the disclosure. FIG. 12 is an illustration diagram (a state before rotation) of the solidified layer forming step using the lamination molding apparatus 100 according to the embodiment of the disclosure, and FIG. 13 is an illustration diagram (a state after rotation) of the solidified layer forming step using the lamination molding apparatus 100 according to the embodiment of the disclosure. FIG. 14 is an illustration diagram (a temperature detection step) of the solidified layer forming step using the lamination molding apparatus 100 according to the embodiment of the disclosure, and FIG. 15 is a flow diagram showing the solidified layer forming step using the lamination molding apparatus 100 according to the embodiment of the disclosure. A manufacturing method of a three-dimensional molded object using the lamination molding apparatus 100 is described with reference to FIGS. 11 to 15. Here, with respect to the illustration diagrams of FIGS. 11 to 14, the solidified body 81 is omitted for convenience of the description, but in the actual solidified layer forming step, the solidified body 81 is formed in the molding region R.

The lamination molding apparatus 100 of the embodiment is particularly effective for a manufacturing method of a three-dimensional molded object in which the temperature adjustment is performed on the solidified layer during molding. As the manufacturing method of a three-dimensional molded object in which the temperature adjustment is performed on the solidified layer during molding, a molding method is exemplified in which a martensitic metal is used as the material forming the material layer 8, and the temperature adjustment is performed on the solidified layer each time the one or more solidified layers are formed to intentionally progress the martensitic transformation. More specifically, each time the one or more solidified layers are newly molded, the temperature adjustment is performed on the solidified layer which is newly molded in the order of a molding temperature T1, a cooling temperature T2, and the molding temperature T1. Moreover, if a martensitic transformation starting temperature of the solidified layer is set to Ms and a martensitic transformation ending temperature of the solidified layer is set to Mf, all the relationships of the following equations (1) to (3) are satisfied.

$$T1 \geq Mf \quad (1)$$

$$T1 > T2 \quad (2)$$

$$T2 \leq Ms \quad (3)$$

Moreover, the application invention is also effective for other manufacturing methods of a three-dimensional molded object in which the temperature adjustment is performed on the solidified layer during molding.

In the following, the one or more solidified layers cooled by the temperature adjustment device 60 are referred to as upper surface layers. The upper surface layer includes at least the uppermost solidified layer of the solidified body 81 at each cooling time point. After sintering, the upper surface layer before being cooled in the cooling step is in a state containing an austenite phase, and a part or all of the austenite phase is transformed into a martensite phase by cooling the upper surface layer to the cooling temperature T2.

First, a height of the molding table 5 is adjusted to an appropriate position in a state where the base plate 33 is placed on the molding table 5 (S101).

After the height of the molding table 5 is adjusted, the solidified layer forming step is performed. In the solidified layer forming step, the heater 92 of the table temperature adjustment device 90 arranged in the molding table 5 is driven to heat the molding table 5 to the molding temperature T1 (S102), and the thermoelectric element 61b of the temperature adjustment device 60 is applied to heat the heating/cooling plate 61a to the molding temperature T1 (S103). Here, as shown in FIG. 11, the temperature adjustment device 60 is in a state where the temperature adjustment plate 61 is in the upright state and the temperature adjustment device 60 is stopped at the retraction position PE, the locking member for retraction position 1e and the position fixing hole 66 of the temperature adjustment device 60 are engaged with each other, and the temperature adjustment device 60 is fixed to the chamber 1.

Next, a recoating step and a solidification step shown below are repeated one or more times.

In the recoating step, the recoater head 11 in which the material powder is filled in the material accommodation portion 11a is moved from a left side of the paper surface to the right side (FIG. 1) in the B-axis direction shown by the arrow. Thereby, the material layer 8 is formed on the base plate 33 (S104).

Next, in the solidification step, by irradiating the laser light L to the irradiation region of the material layer 8, this irradiation region is melted or sintered, and a solidified layer 81a which is the first layer is formed on the base plate 33 (S105).

When the temperature adjustment is performed on the plurality of solidified layers at once, the height of the molding table 5 is subsequently lowered by the thickness of the material layer 8, and the recoating step and the solidification step are performed again. Specifically, the recoater head 11 is moved from a right side of the molding region R to the left side, and the material layer 8 is formed on the molding region. Then, the laser light L is irradiated to the irradiation region of the material layer 8 to melt or sinter the irradiation region, and a solidified layer 81b which is the second layer is formed on the base plate 33.

Figure 22:
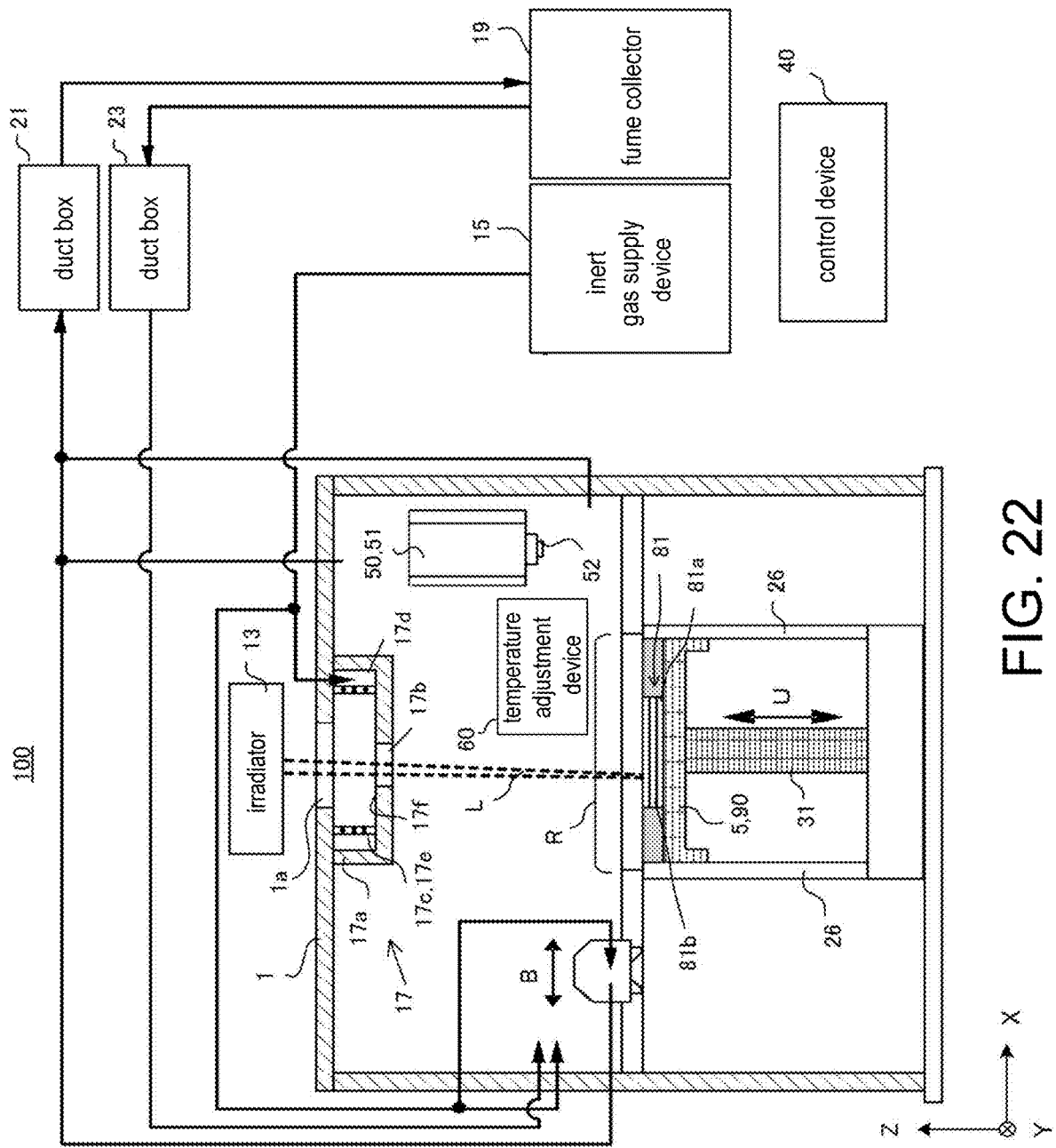
FIG. 22 is an illustration diagram of a solidified layer forming step using the lamination molding apparatus 100 according to the embodiment of the disclosure.

In this way, in the solidified layer forming step, the solidified body 81 is formed by repeating the formation of the plurality of solidified layers 81a, 81b . . . . These solidified layers which are sequentially laminated are firmly fixed to each other (FIG. 22).

After the above steps are repeated and the predetermined one or more solidified layers are formed, the heating step and the cooling step are performed by the temperature adjustment device 60. In the heating step, the temperature of the upper surface layer of the solidified body 81 is heated to the molding temperature T1, and then the temperature of the upper surface layer of the solidified body 81 is cooled to the cooling temperature T2 in the cooling step.

In the heating step, first, the locking member for retraction position 1e is operated to release the connection between the chamber 1 and the temperature adjustment device 60, and the temperature adjustment device 60 and the recoater head 11 are connected by operating the transport locking member 65. Then, the recoater head 11 is moved to the heating/cooling position PT along the B-axis direction, and thereby the connected temperature adjustment device 60 is moved from the retraction position PE to the heating/cooling position PT in the state where the temperature adjustment plate 61 is in the upright state (S106).

Thereafter, the locking member for heating/cooling position 1t is operated to fix the temperature adjustment device 60 to the chamber 1, the transport locking member 65 is operated to release the connection between the temperature adjustment device 60 and the recoater head 11, and the recoater head 11 is retracted from the molding region R along the B-axis direction (FIG. 12).

Then, as shown in FIG. 13, by driving the revolving portion 63, the temperature adjustment plate 61 is revolved to the lying state, the heating/cooling plate 61a is abutted against the upper surface of the solidified body 81, and the upper surface of the solidified body 81 is heated to the molding temperature T1 (S107). By using the ball joint 621a as the connection structure between the revolving portion 63 and the temperature adjustment plate 61, the abutting surface between the ball joint 621a and the receiving piece 622a slides, and the heating/cooling plate 61a can be brought into close contact with the entire upper surface of the solidified body 81.

As shown in FIG. 14, the temperature measurement unit 70 is moved above the solidified body 81 to measure the temperature of the upper surface of the solidified body 81, and the feedback control may be performed in which the solidified body 81 is heated until the temperature of the upper surface of the solidified body 81 reaches the molding temperature T1 (S108).

When the temperature of the upper surface of the solidified body 81 becomes the molding temperature T1, the process moves to the cooling step.

In the cooling step, the heater 92 of the table temperature adjustment device 90 which is arranged in the molding table 5 is stopped, the cooler 93 of the table temperature adjustment device 90 is driven, and the lower solidified layer and the base plate 33 which is in contact with the top plate 5a of the molding table 5 are cooled (S109). At this time, the molding table 5 does not need to be cooled to the cooling temperature T2, as long as the molding table 5 is cooled to an extent that excessive heat transmission to the solidified body 81 can be suppressed.

Furthermore, the thermoelectric element 61b of the temperature adjustment device 60 is applied to cool the heating/cooling plate 61a to the cooling temperature T2, and the upper surface layer of the solidified body 81 is cooled to the cooling temperature T2 by the temperature adjustment plate 61 (S110).

As described above, the cooling temperature T2 is equal to or less than the martensitic transformation starting temperature Ms. The cooling temperature T2 may be equal to or less than the martensitic transformation ending temperature Mf. At this time, the progress of the martensitic transformation of the three-dimensional molded object after molding can be prevented. Specific values of the martensitic transformation starting temperature Ms and the martensitic transformation ending temperature Mf vary according to the composition of the material. Therefore, it is necessary to set the cooling temperature T2 to a low temperature such as −20° C. or the like according to the material. In the lamination molding apparatus 100 of the embodiment, only a part of the solidified body 81 including the upper surface layer may be cooled, and thus the upper surface layer can be quickly cooled even if the cooling temperature T2 is low, and the upper surface layer can be quickly reheated to the molding temperature T1 after the cooling step.

In addition, similar to the heating step, the temperature of the upper surface of the solidified body 81 is measured by the temperature measurement unit 70, and the feedback control may be performed in which the solidified body 81 is cooled until the temperature of the upper surface of the solidified body 81 reaches the cooling temperature T2 (S111).

When the cooling step is completed, the temperature adjustment plate 61 of the temperature adjustment device 60 is revolved from the lying state to the upright state by the revolving portion 63 (S112). Then, the recoater head 11 is driven to be moved to the heating/cooling position PT along the B-axis direction, the locking member for heating/cooling position 1t is operated to release the connection between the chamber 1 and the temperature adjustment device 60, and the temperature adjustment device 60 and the recoater head

11 are connected by operating the transport locking member 65. By moving the recoater head 11 to the retraction position PE along the B-axis direction, the connected temperature adjustment device 60 is moved from the heating/cooling position PT to the retraction position PE in the state where the temperature adjustment plate 61 is in the upright state (S113).

Thereafter, the locking member for retraction position 1e is operated to fix the temperature adjustment device 60 to the chamber 1, and the transport locking member 65 is operated to release the connection between the temperature adjustment device 60 and the recoater head 11.

Thereafter, the molding temperature T1 is set and the solidified layer forming step is performed again. At least until the next solidification step is performed, the temperature of the molding table 5 is adjusted to the molding temperature T1 by the table temperature adjustment device 90 arranged on the molding table 5, and the thermoelectric element 61b of the temperature adjustment device 60 is further applied to heat the heating/cooling plate 61a to the molding temperature T1. The temperature of the material layer 8 is reheated to the molding temperature T1.

As described above, in the embodiment, the temperature of the temperature adjustment plate 61 is adjusted in a manner that the thermoelectric element 61b of the temperature adjustment device 60 is applied to heat the heating/cooling plate 61a to the molding temperature T1 in the heating step, and the temperature adjustment plate 61 is switched from heating to cooling in a short time to adjust the temperature to the cooling temperature T2 in the cooling step. The upper surface layer of the solidified body 81 is heated and cooled by abutting the temperature adjustment plate 61 against the upper surface of the solidified body 81. Thereby, compared with the case in which only the temperature adjustment mechanism arranged in the molding table 5 is used to heat and cool, the temperature of the upper surface layer can be adjusted more quickly, and the molding time of the three-dimensional molded object can be shortened.

2. Second Embodiment (2.1 Lamination Molding Apparatus 200)

Figure 16:
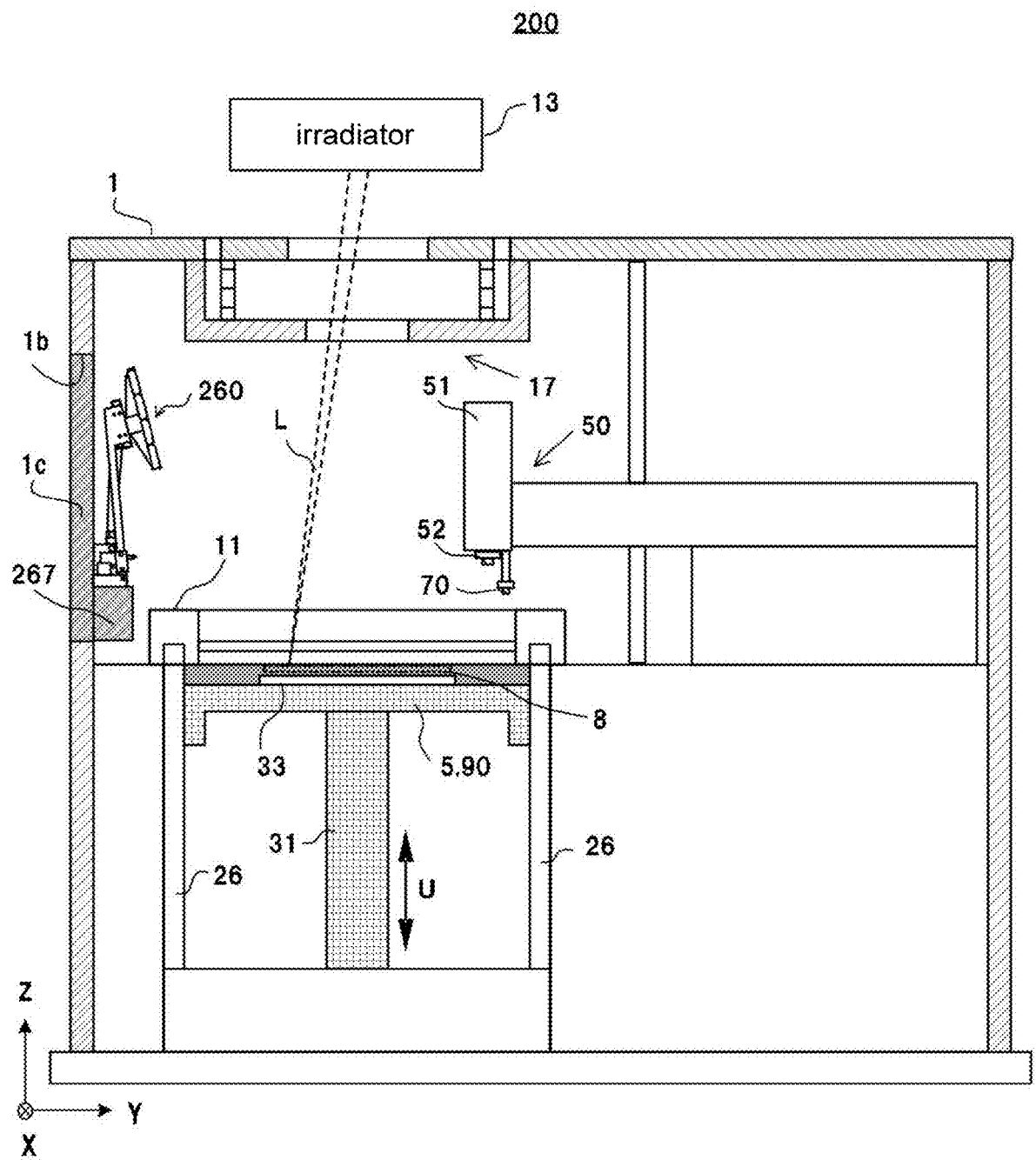
FIG. 16 is a schematic side view of a lamination molding apparatus 200 according to a second embodiment of the disclosure.
Figure 17:
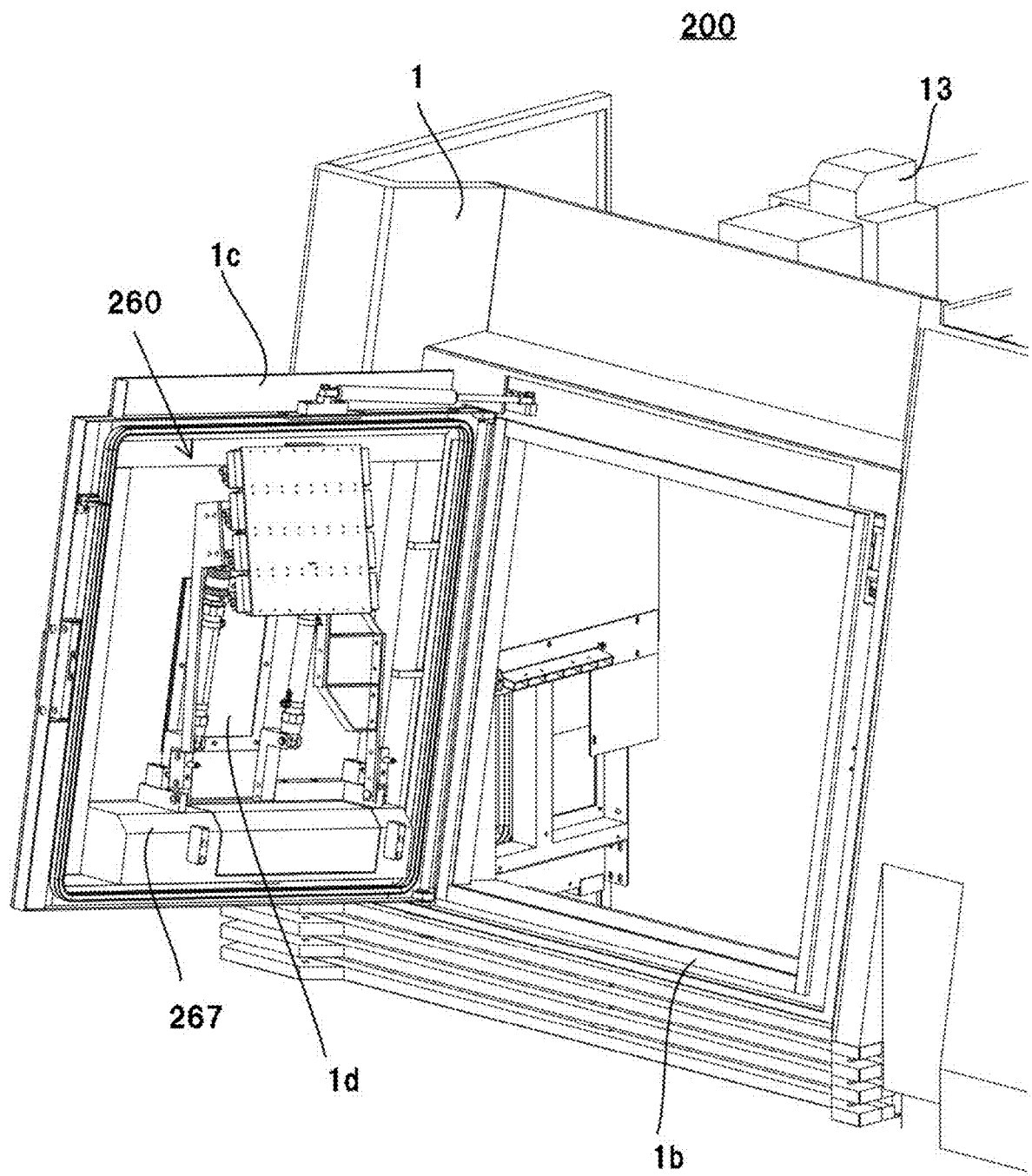
FIG. 17 is a rear perspective view of a temperature adjustment device 260 according to the embodiment of the disclosure.

FIG. 16 is a schematic side view of a lamination molding apparatus 200 according to a second embodiment of the disclosure. FIG. 17 is a rear perspective view of a temperature adjustment device 260 according to the embodiment of the disclosure.

The temperature adjustment device 60 according to the first embodiment is arranged to be capable of moving backward and forward in the B-axis direction along the inner side surface of the chamber 1, but the temperature adjustment device 260 according to the second embodiment of the disclosure is different in that the temperature adjustment device 260 is integrally attached to the back surface of the working door 1c, and other configurations and actions in the first embodiment are the same as those in the second embodiment. Thus, the same configurations and actions are designated by the same reference numerals and detailed description thereof is omitted.

The lamination molding apparatus 200 according to the embodiment of the disclosure is a lamination molding apparatus which generates a three-dimensional molded object having a desired shape by laminating the plurality of solidified layers in a manner of repeating the steps in which the material layer 8 is formed in the molding region R in which the three-dimensional molded object is formed, and the beam which is, for example, the laser light L, is irradiated to the irradiation region of the material layer 8 to melt or sinter the irradiation region of the material layer 8.

The lamination molding apparatus 200 of the disclosure includes the chamber 1, the inert gas supply device 15, the protection window pollution prevention device 17, the fume collector 19, the molding table 5, the irradiator 13, the material layer forming device 3, the control device 40, the cutting device 50, the temperature adjustment device 260, the temperature measurement unit 70, and the table temperature adjustment device 90.

Figure 20:
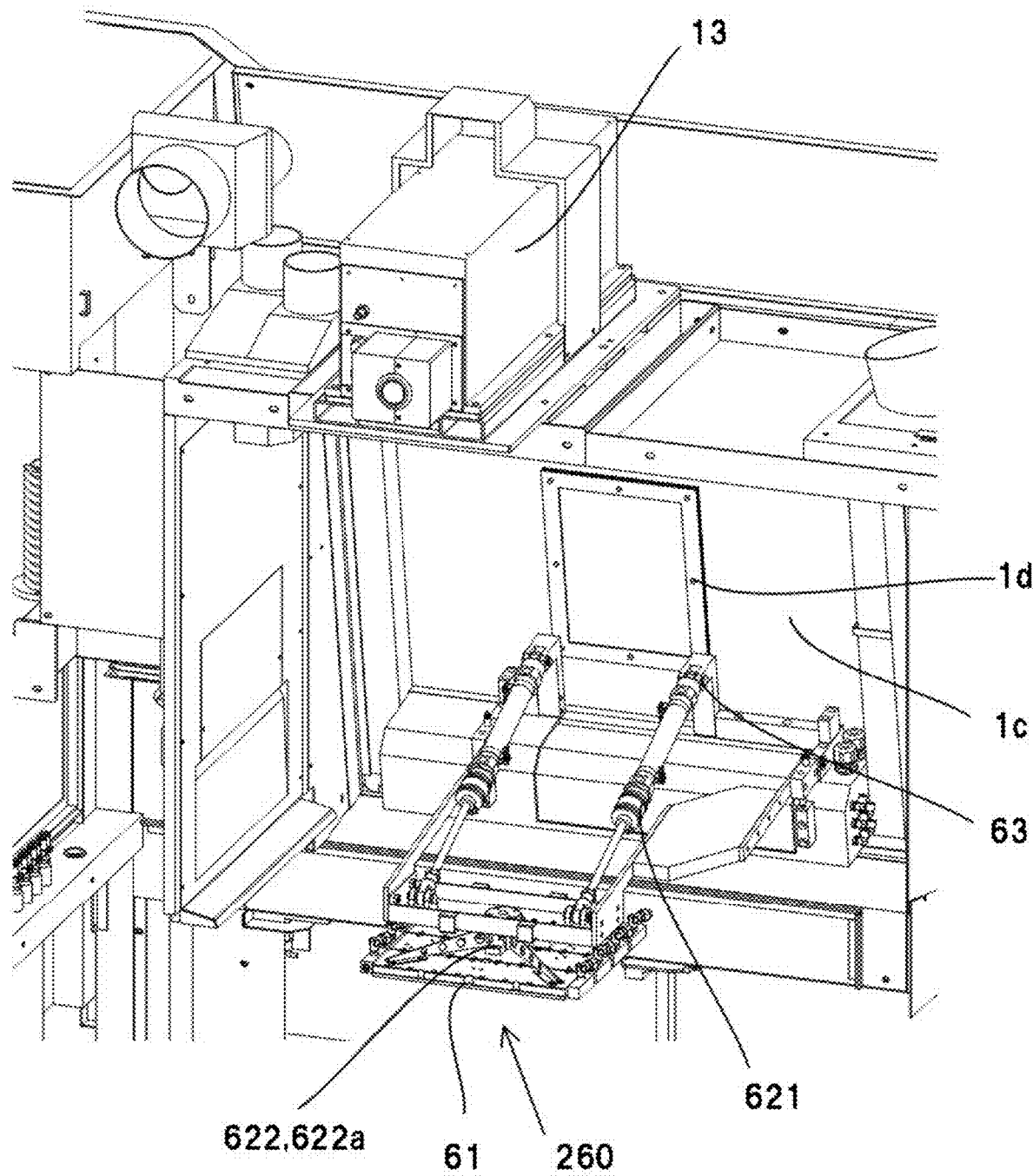
FIG. 20 is an illustration diagram (a state after rotation) of a solidified layer forming step using the lamination molding apparatus 200 according to the embodiment of the disclosure.

The chamber 1 is a housing body of the lamination molding apparatus 200, the formed opening 1b is arranged in the anterior surface of the chamber 1, and the working door 1c having a viewing window 1d is arranged in the opening 1b (FIG. 16, FIG. 17, and FIG. 20).

The working door 1c is revolvably arranged in the opening 1b in a hinge opening/closing type, and the temperature adjustment device 260 described later is fixed to the back surface of the working door 1c in a manner of be changeable from the upright state (FIG. 18) to the lying state (FIG. 19) and from the lying state to the upright state.

In addition, the temperature adjustment device 260 is arranged to be stored in the back surface of the working door 1c (FIG. 17), and problems, for example, the temperature adjustment device 260 does not interfere when the working door 1c is opened and closed, and the like do not occur.

(2.2 Temperature Adjustment Device 260)

Figure 18:
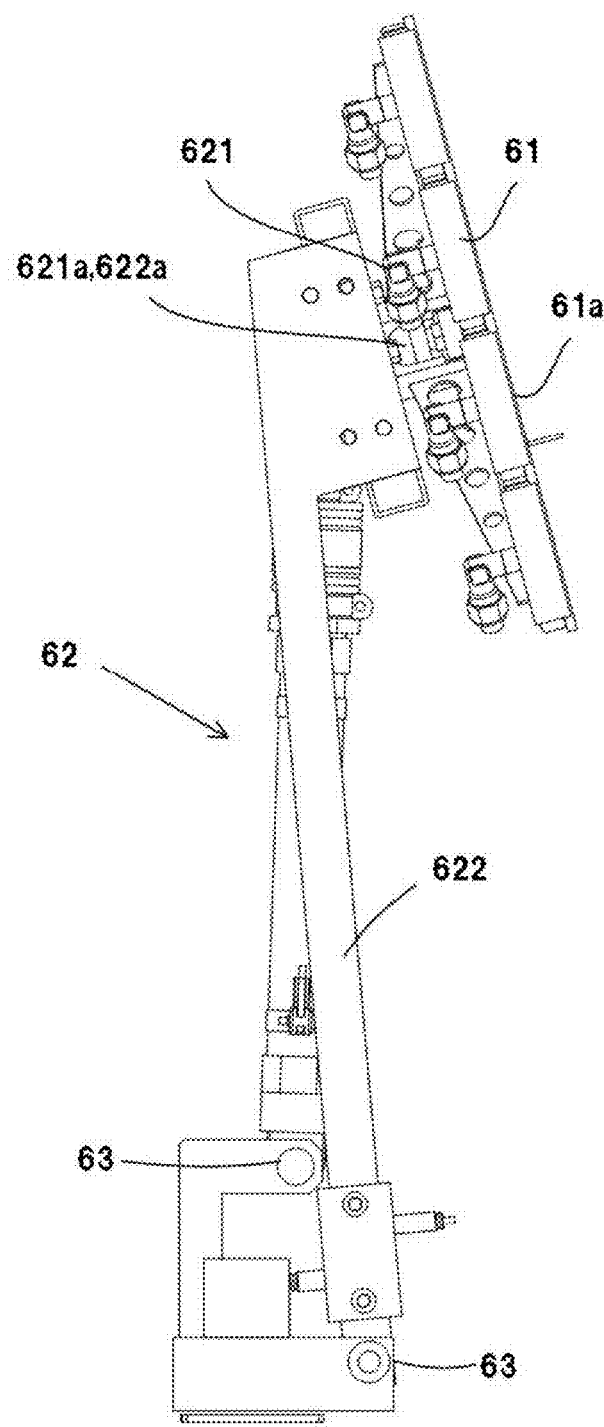
FIG. 18 is a side view of the temperature adjustment device 260 in which the temperature adjustment plate 61 according to the embodiment of the disclosure is in the upright state.
Figure 19:
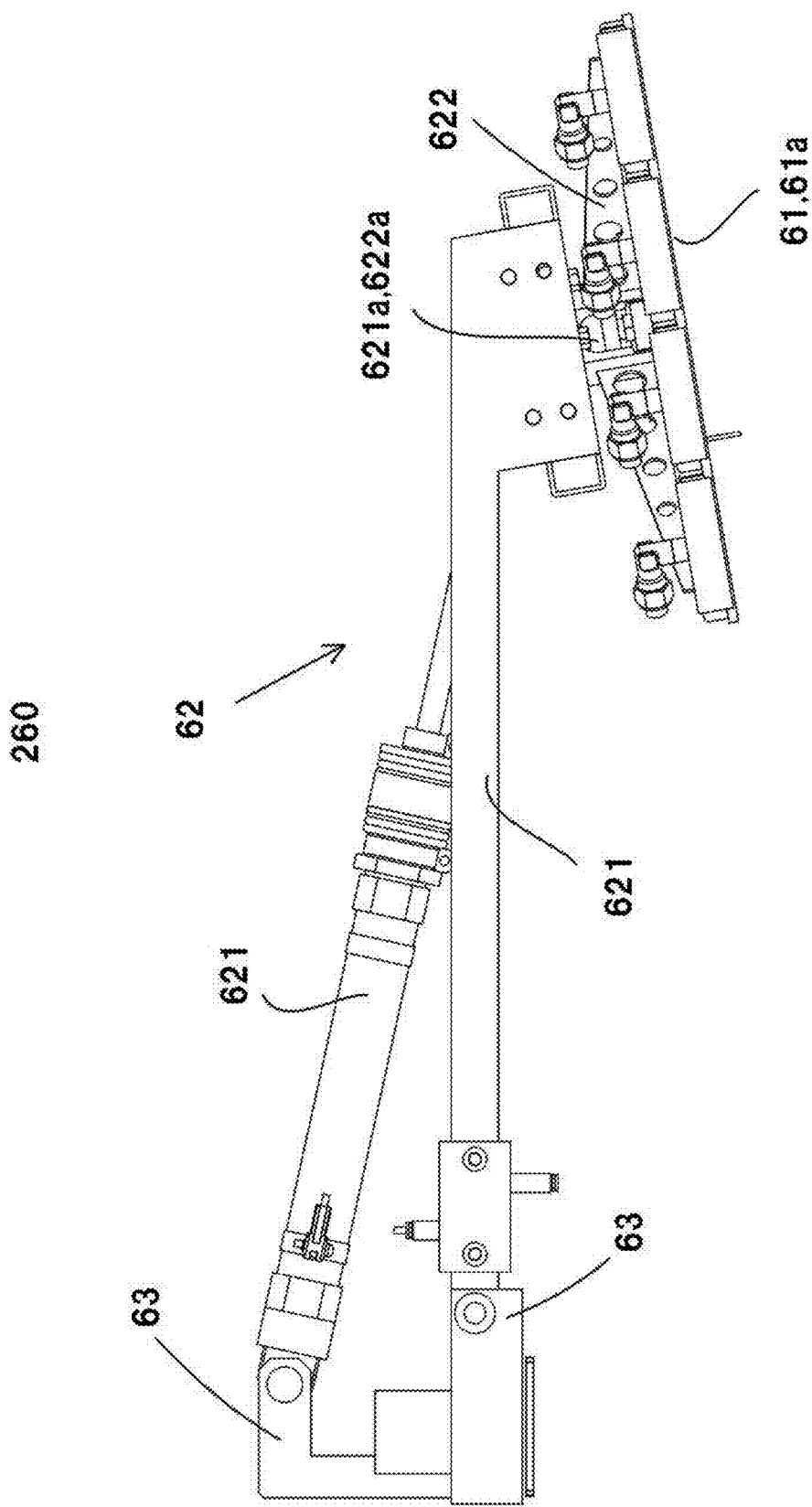
FIG. 19 is a side view of the temperature adjustment device 260 in which the temperature adjustment plate 61 according to the embodiment of the disclosure is in the lying state.

FIG. 18 is a side view of the temperature adjustment device 260 in which the temperature adjustment plate 61 according to the embodiment of the disclosure is in the upright state. FIG. 19 is a side view of the temperature adjustment device 260 in which the temperature adjustment plate 61 according to the embodiment of the disclosure is in the lying state.

The temperature adjustment device 260 according to the embodiment of the disclosure is a device for heating or cooling the three-dimensional molded object by bringing the temperature adjustment plate 61 into close contact with the upper surface of the solidified layer obtained by sintering the material layer 8, and the temperature adjustment device 260 is fixed to the back surface of the working door 1c (FIG. 16 and FIG. 17).

The temperature adjustment device 260 is configured by the temperature adjustment plate 61, the attachment portion 62, a revolving portion 263, and a working door attachment portion 267.

The temperature adjustment plate 61 is a flat plate shape member which is in close contact with the upper surface of the solidified body 81 formed by laminating the solidified layers which are formed by irradiating the beam such as the laser light L or the like to the material layer 8.

The revolving portion 263 is a member which revolves the temperature adjustment plate 61 between the lying state in which the temperature adjustment plate 61 lies down along the horizontal direction (the direction parallel to the XY plane) and the upright state in which the temperature adjustment plate 61 stand upright along the vertical direction (the Z direction). When the temperature adjustment by the temperature adjustment device 260 is not performed, the temperature adjustment plate 61 is set to the upright state shown in FIG. 18. When the temperature adjustment is performed, the temperature adjustment plate 61 is set to the lying state shown in FIG. 19.

The revolving portion 263 is, for example, an air cylinder. As the revolving portion 263, other revolving mechanisms such as a hydraulic cylinder, an electric actuator, and the like may be used.

The attachment portion 62 is the member for connecting the temperature adjustment plate 61 and the revolving portion 263, and is configured by the back surface attachment portion 621 and the lower attachment portion 622. The back surface attachment portion 621 is fixed to the back surface of the thermoelectric element 61b, and the ball joint 621a is arranged at the center position of the thermoelectric element 61b. The lower end of the lower attachment portion 622 is fixed to a rotation shaft of the revolving portion 263 and is erected in the vertical direction, and the receiving piece 622a connected to the ball joint 621a is arranged at the upper end of the lower attachment portion 622. The abutting surface between the ball joint 621a and the receiving piece 622a is formed to slide freely, and the revolving portion 263 and the temperature adjustment plate 61 are slidably connected via the attachment portion 62.

The working door attachment portion 267 for fixing to the working door 1c is fixed to the bottom surface of the revolving portion 263 (FIG. 16 and FIG. 17), and the working door attachment portion 267 is fixed to the back surface of the working door 1c.

(2.3. Manufacturing Method of Three-Dimensional Molded Object)

Figure 21:
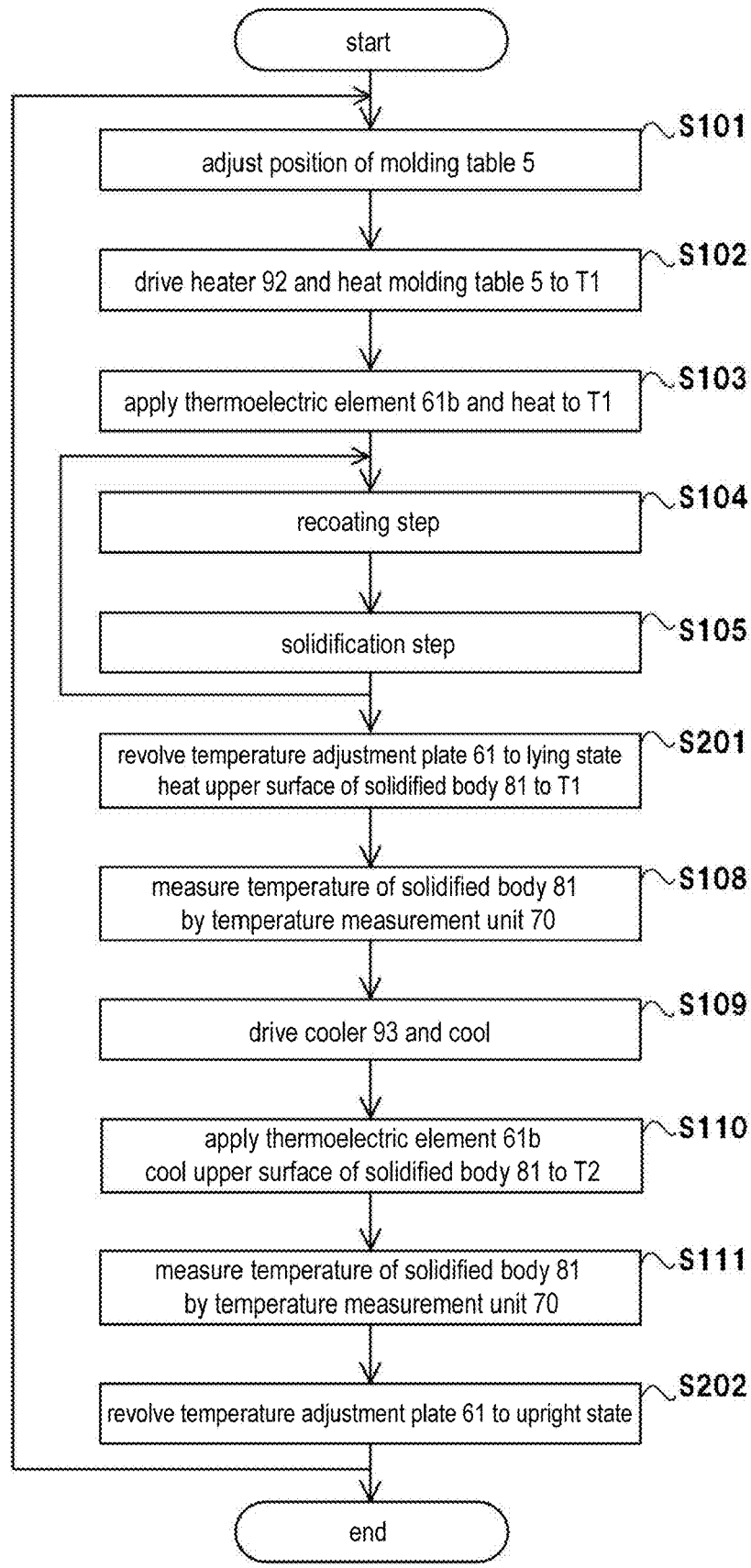
FIG. 21 is a flow diagram showing the solidified layer forming step using the lamination molding apparatus 200 according to the embodiment of the disclosure.

FIG. 20 is an illustration diagram (a state after rotation) of a solidified layer forming step using the lamination molding apparatus 200 according to the embodiment of the disclosure, and FIG. 21 is a flow diagram showing the solidified layer forming step using the lamination molding apparatus 200 according to the embodiment of the disclosure.

With respect to the illustration diagram of FIG. 20, the solidified body 81 is omitted, but in the actual solidified layer forming step, the solidified body 81 is formed in the molding region R.

Similar to the lamination molding apparatus 100 according to the first embodiment, in the lamination molding apparatus 200 of the embodiment, the molding method is used in which the martensitic metal is used as the material for forming the material layer 8, and the temperature adjustment is performed on the solidified layer each time the one or more solidified layers are formed to intentionally progress the martensitic transformation. More specifically, each time the one or more solidified layers are newly molded, the temperature adjustment is performed on the solidified layer which is newly molded in the order of the molding temperature T1, the cooling temperature T2, and the molding temperature T1.

First, the position of the height of the molding table 5 is adjusted (S101), the heater 92 of the table temperature adjustment device 90 is heated to the molding temperature T1 (S102), and the thermoelectric element 61b of the temperature adjustment device 260 is applied to heat the heating/cooling plate 61a to the molding temperature T1 (S103). Here, as shown in FIG. 16, the temperature adjustment device 260 is fixed to the back surface of the working door 1c in the state where the temperature adjustment plate 61 is in the upright state.

Then, the recoating step (S104) and the solidification step (S105) are repeated one or more times.

After the one or more solidified layers are formed, the heating step and the cooling step are performed by the temperature adjustment device 260. In the heating step, the temperature of the upper surface layer of the solidified body 81 is heated to the molding temperature T1, and then the temperature of the upper surface layer of the solidified body 81 is cooled to the cooling temperature T2 in the cooling step.

In the heating step, as shown in FIG. 20, by driving the revolving portion 263, the temperature adjustment plate 61 is revolved to the lying state, the heating/cooling plate 61a is abutted against the upper surface of the solidified body 81, and the upper surface of the solidified body 81 is heated to the molding temperature T1 (S201). By using the ball joint 621a as the connection structure between the revolving portion 263 and the temperature adjustment plate 61, the abutting surface between the ball joint 621a and the receiving piece 622a slides, and the heating/cooling plate 61a can be brought into close contact with the entire upper surface of the solidified body 81.

The temperature of the upper surface of the solidified body 81 is measured by the temperature measurement unit 70, and the feedback control may be performed (S108).

When the temperature of the upper surface of the solidified body 81 becomes the molding temperature T1, the process moves to the cooling step.

In the cooling step, the cooler 93 of the table temperature adjustment device 90 is driven to cool the lower solidified layer (S109), the thermoelectric element 61b of the temperature adjustment device 260 is applied to cool the heating/cooling plate 61a to the cooling temperature T2, and the upper surface layer of the solidified body 81 is cooled to the cooling temperature T2 by the temperature adjustment plate 61 (S110).

In addition, similar to the heating step, the temperature of the upper surface of the solidified body 81 is measured by the temperature measurement unit 70, and the feedback control may be performed in which the solidified body 81 is cooled until the temperature of the upper surface of the solidified body 81 reaches the cooling temperature T2 (S111).

When the cooling step is completed, the temperature adjustment plate 61 of the temperature adjustment device 260 is revolved from the lying state to the upright state by the revolving portion 263 (S202). Thereafter, the molding temperature T1 is set, and the solidified layer forming step is further performed.

In this way, because the temperature adjustment device 260 is fixed to the back surface of the working door 1c, it is not necessary to drive the temperature adjustment device 260 by the drive mechanism when the solidified body 81 is heated and cooled, and the function can be realized by a simple structure without interfering with other steps.

What is claimed is:

1. A lamination molding apparatus, comprising:
    an irradiator irradiating a material layer with a beam to form a solidified layer, wherein the material layer is formed for each of a plurality of divided layers obtained by dividing a desired three-dimensional molded object at a predetermined height in a molding region; and
    a temperature adjustment device configured to abut against a part or all of a solidified body, which comprises an upper surface of the solidified body that is formed by laminating the solidified layer, and to heat and cool the part or all of the solidified body to a set temperature, wherein
    the temperature adjustment device comprises:
    a temperature adjustment plate which is heated and cooled to the set temperature;
    a revolving portion configured to revolve the temperature adjustment plate between an upright state in which the temperature adjustment plate stands upright along a vertical direction and a lying state in which the temperature adjustment plate lies down along a horizontal direction; and a back surface attachment portion and a lower attachment portion connecting the temperature adjustment plate and the revolving portion, wherein the revolving portion is configured to set the temperature adjustment plate to the upright state when the part or all of the solidified body comprising the upper surface of the solidified body is not heated and cooled by the temperature adjustment device, and to set the temperature adjustment plate to the lying state when the part or all of the solidified body comprising the upper surface of the solidified body is heated and cooled by the temperature adjustment device, wherein the back surface attachment portion comprises a ball joint fixed to a central position of a back surface of the temperature adjustment plate, a lower end of the lower attachment portion comprises a pair of support columns fixed to a rotation shaft of the revolving portion, a connection member connecting upper ends of the pair of support columns, and a receiving piece connected to the ball joint provided at a central position of the connection member, wherein an abutting surface formed between the ball joint and the receiving piece is slidable, and the temperature adjustment plate and the revolving portion are connected only by a connection structure of the ball joint and the receiving piece.

2. The lamination molding apparatus according to claim 1, wherein the lamination molding apparatus further comprises a control device performing driving control of the temperature adjustment device, the temperature adjustment plate has thermoelectric elements and a lead wire connection portion provided on the back surface of the temperature adjustment plate and at an end part of the temperature adjustment plate, the control device switches between heating and cooling of the temperature adjustment plate by changing a direction of a direct current flowing through the thermoelectric elements via the lead wire connection portion.

3. The lamination molding apparatus according to claim 1, wherein the temperature adjustment device has a locking member connected to a drive device, and the locking member is a cylinder actioned to project a pin body and fit the pin body into a locking hole of the drive device when the temperature adjustment device is connected to the drive device, and when the part or all of the solidified body comprising the upper surface of the solidified body is heated and cooled, the locking member is connected to the drive device, and by moving the drive device, the temperature adjustment device is moved from a retraction position away from the molding region to a processing position for heating and cooling which is adjacent to the molding region, wherein the drive device is a recoater head which reciprocatively moves in a horizontal uniaxial direction and supplies and flattens a material powder to form the material layer, and the temperature adjustment device is connected to the recoater head and reciprocatively moves in the horizontal uniaxial direction.

4. The lamination molding apparatus according to claim 1, wherein the temperature adjustment device is fixed to a back surface of a working door.

5. The lamination molding apparatus according to claim 1, wherein the lamination molding apparatus further comprises a table temperature adjustment device provided inside a molding table, the table temperature adjustment device is configured to heat and cool a lower solidified layer and a base plate contacting the molding table, the temperature adjustment device is configured to contact the upper surface of the solidified body to perform heating and cooling.

6. The lamination molding apparatus according to claim 2, wherein the lamination molding apparatus further comprises a table temperature adjustment device provided inside a molding table, the table temperature adjustment device is configured to heat and cool a lower solidified layer and a base plate contacting the molding table, the temperature adjustment device is configured to contact the upper surface of the solidified body to perform heating and cooling.

* * * * *